(12) United States Patent
Arizono et al.

(10) Patent No.: US 12,086,663 B2
(45) Date of Patent: Sep. 10, 2024

(54) PRINTING APPARATUS AND BATCH ADJUSTMENT METHOD THEREFOR

(71) Applicant: SCREEN HOLDINGS CO., LTD., Kyoto (JP)

(72) Inventors: Shigenori Arizono, Kyoto (JP); Kohei Ueda, Kyoto (JP); Ryoko Sakurai, Kyoto (JP); Yuya Takagi, Kyoto (JP); Hiroki Endo, Kyoto (JP); Kenichi Yokouchi, Kyoto (JP); Tomotaka Kato, Kyoto (JP); Asuka Muramatsu, Kyoto (JP); Kensuke Usui, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 18/330,667

(22) Filed: Jun. 7, 2023

(65) Prior Publication Data
US 2023/0419065 A1    Dec. 28, 2023

(30) Foreign Application Priority Data

Jun. 28, 2022    (JP) .................. 2022-103315

(51) Int. Cl.
*G06K 15/02*    (2006.01)
*B41J 2/01*    (2006.01)
(Continued)

(52) U.S. Cl.
CPC .............. *G06K 15/027* (2013.01); *B41J 2/01* (2013.01); *B41J 29/393* (2013.01);
(Continued)

(58) Field of Classification Search
CPC .................. G06K 15/027; G06K 15/16; G06K 2215/101; G06T 7/90; G06T 7/0004;
(Continued)

(56) References Cited

U.S. PATENT DOCUMENTS

2016/0200125 A1 * 7/2016 Takeuchi ............... B41J 2/0459
347/19
2019/0227465 A1 * 7/2019 Suzuki ............... G03G 15/0189

FOREIGN PATENT DOCUMENTS

JP    2020044756 A * 3/2020
JP    2020-049858 A    4/2020
(Continued)

OTHER PUBLICATIONS

English translation of WO-2018225489-A1. (Year: 2018).*
English translation of JP-2020044756-A. (Year: 2020).*

*Primary Examiner* — Thomas D Lee
(74) *Attorney, Agent, or Firm* — Rimon P.C.

(57) ABSTRACT

The inkjet printing apparatus is configured to be able to execute a batch adjustment process of performing a plurality of times of adjustment processes related to printing in succession based on one instruction from an outside. The conveyance control unit maintains the conveyance speed at a first speed in a period when a chart printing process is performed and a period when a chart imaging process is performed. The conveyance control unit decreases the conveyance speed from the first speed to the second speed after the end of the chart imaging process in an adjustment process except for an adjustment process that is performed last in the batch adjustment process, and increases the conveyance speed from the second speed to the first speed before the start of the chart printing process in an adjustment process that is performed next.

16 Claims, 23 Drawing Sheets

(51) Int. Cl.
  *B41J 29/393* (2006.01)
  *G06F 3/12* (2006.01)
  *G06K 15/16* (2006.01)
  *G06T 7/00* (2017.01)
  *G06T 7/90* (2017.01)

(52) U.S. Cl.
  CPC .......... *G06F 3/1208* (2013.01); *G06F 3/1212* (2013.01); *G06F 3/1219* (2013.01); *G06F 3/1256* (2013.01); *G06K 15/16* (2013.01); *G06T 7/0004* (2013.01); *G06T 7/90* (2017.01); *G06K 2215/101* (2013.01); *G06T 2207/10024* (2013.01); *G06T 2207/30144* (2013.01)

(58) Field of Classification Search
  CPC .. G06T 2207/10024; G06T 2207/30144; B41J 2/01; B41J 29/393; G06F 3/1208; G06F 3/1212; G06F 3/1219; G06F 3/1256
  See application file for complete search history.

(56) References Cited

FOREIGN PATENT DOCUMENTS

| WO | WO-2018225489 A1 | * | 12/2018 | ............... B41J 2/01 |
| WO | 2021/117717 A1 | | 6/2021 | |

* cited by examiner

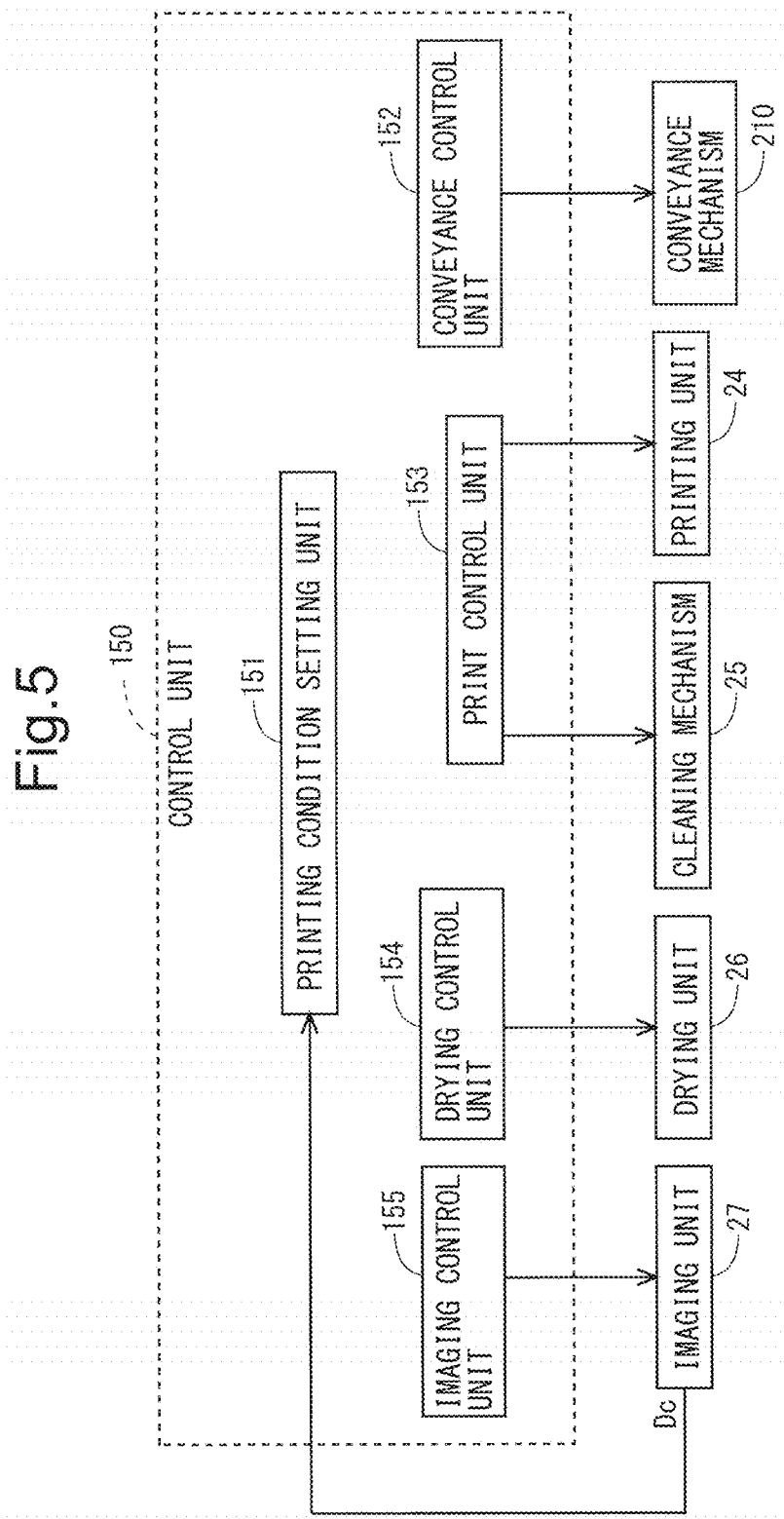

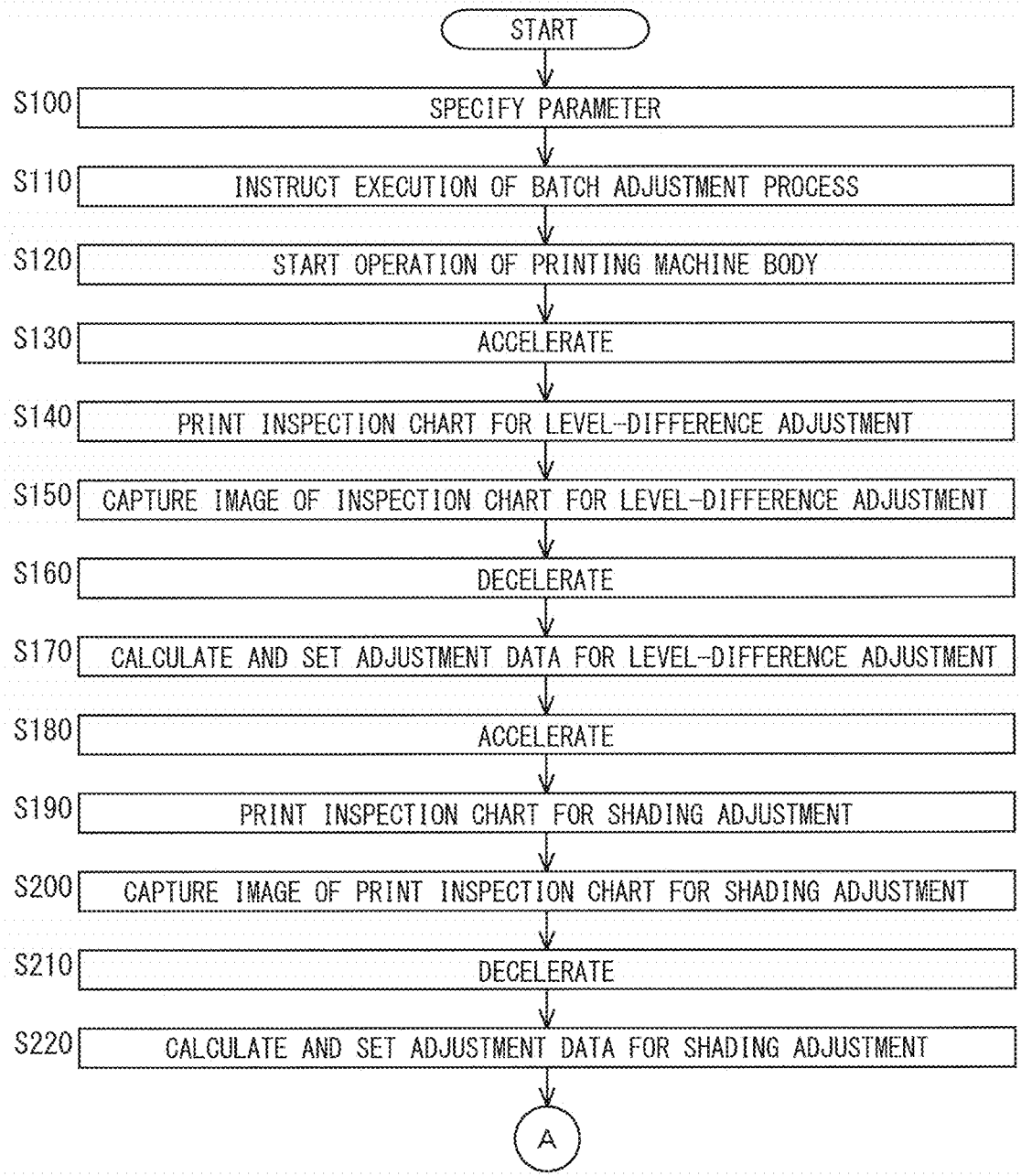

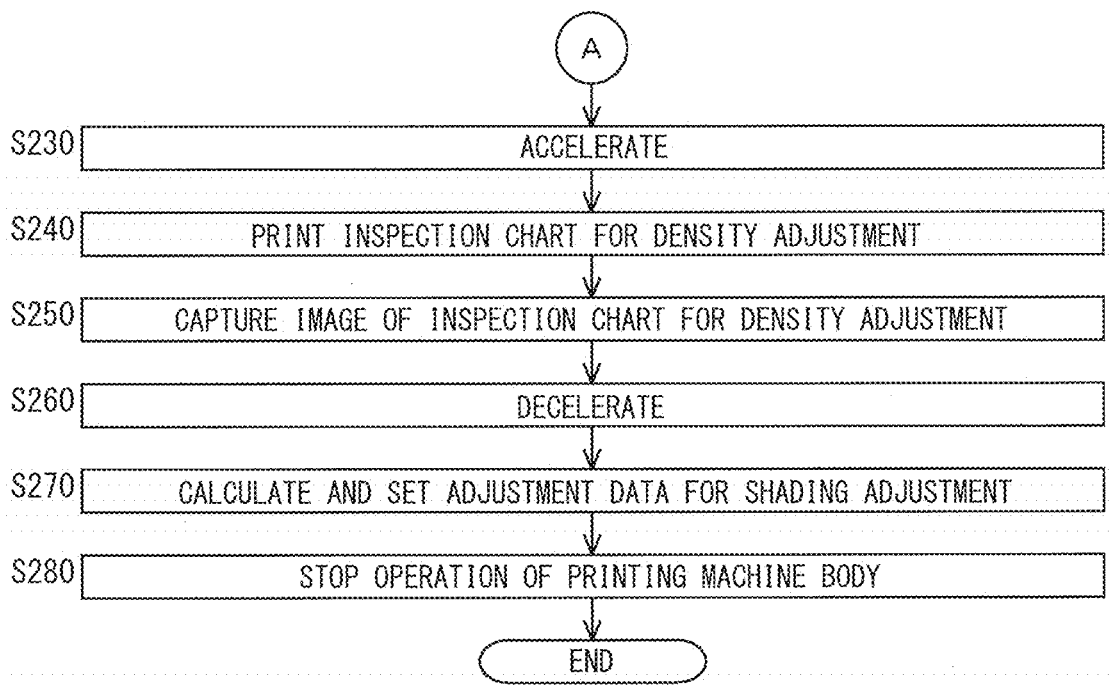
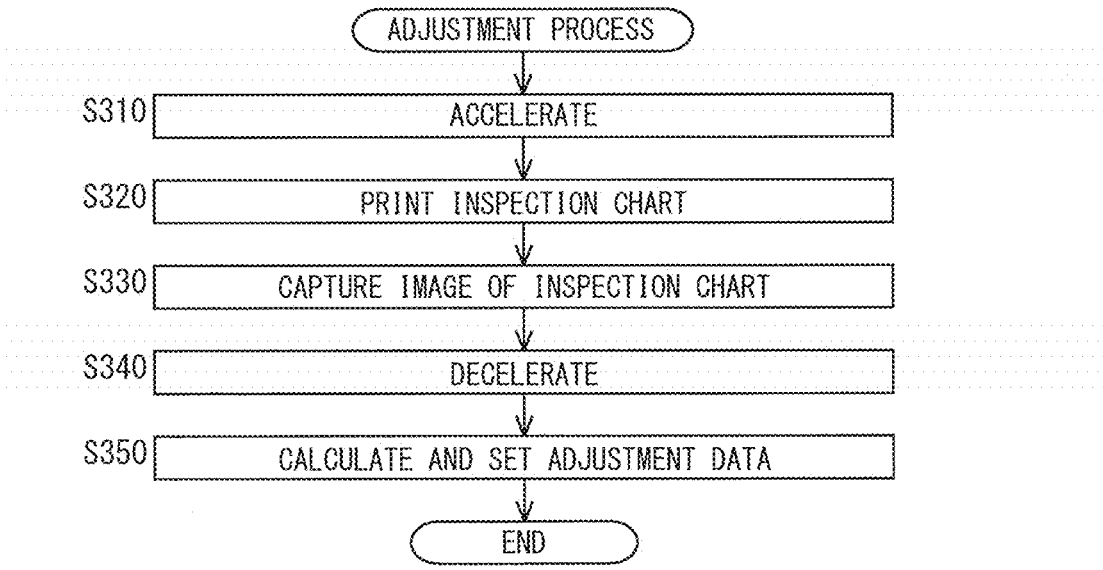

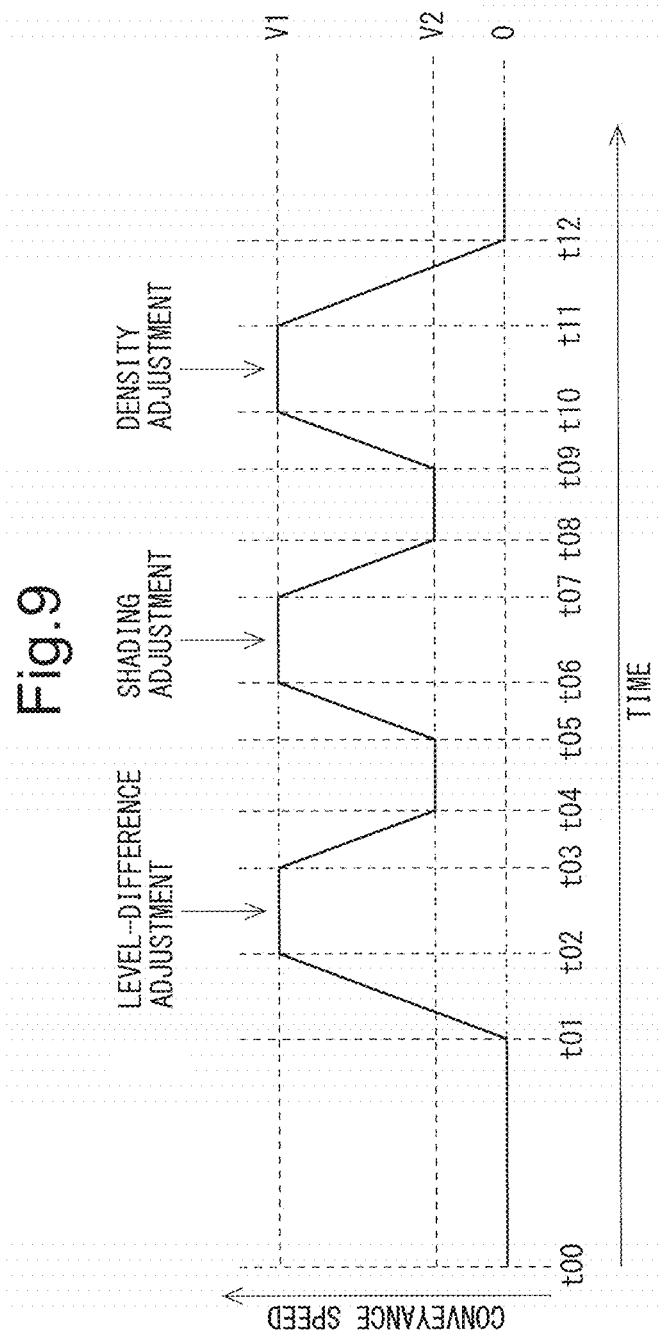

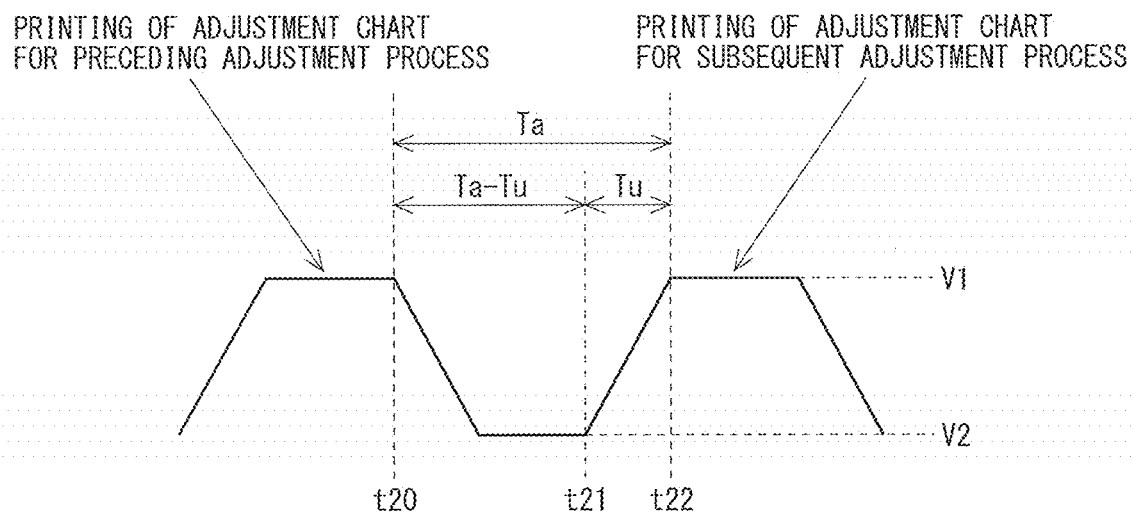

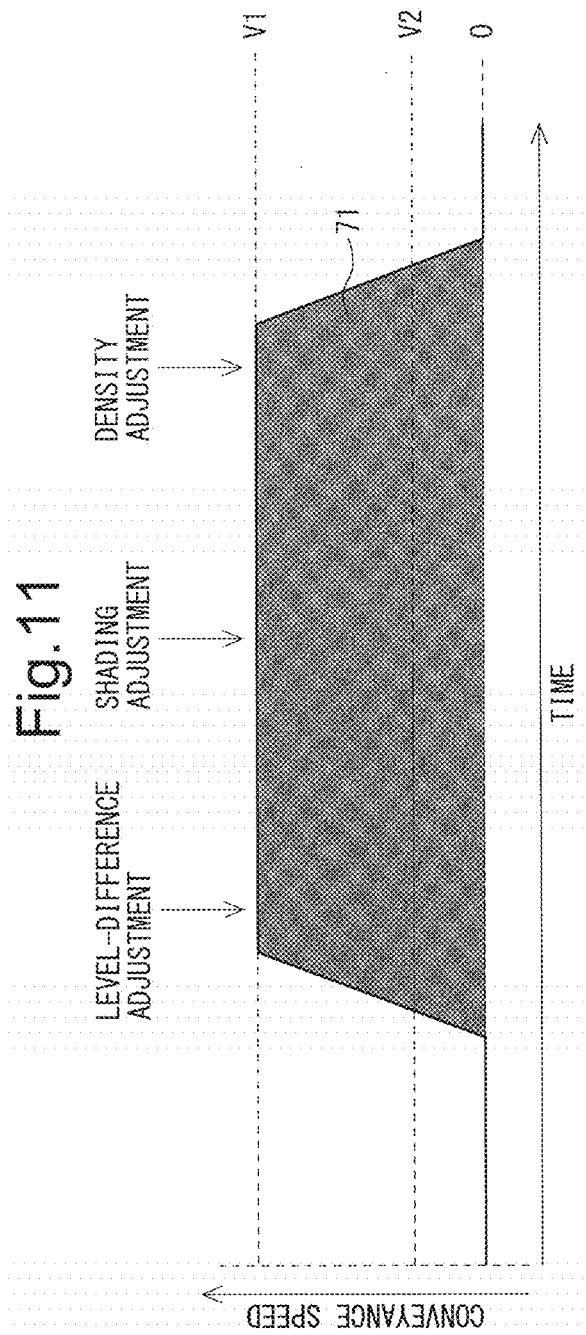

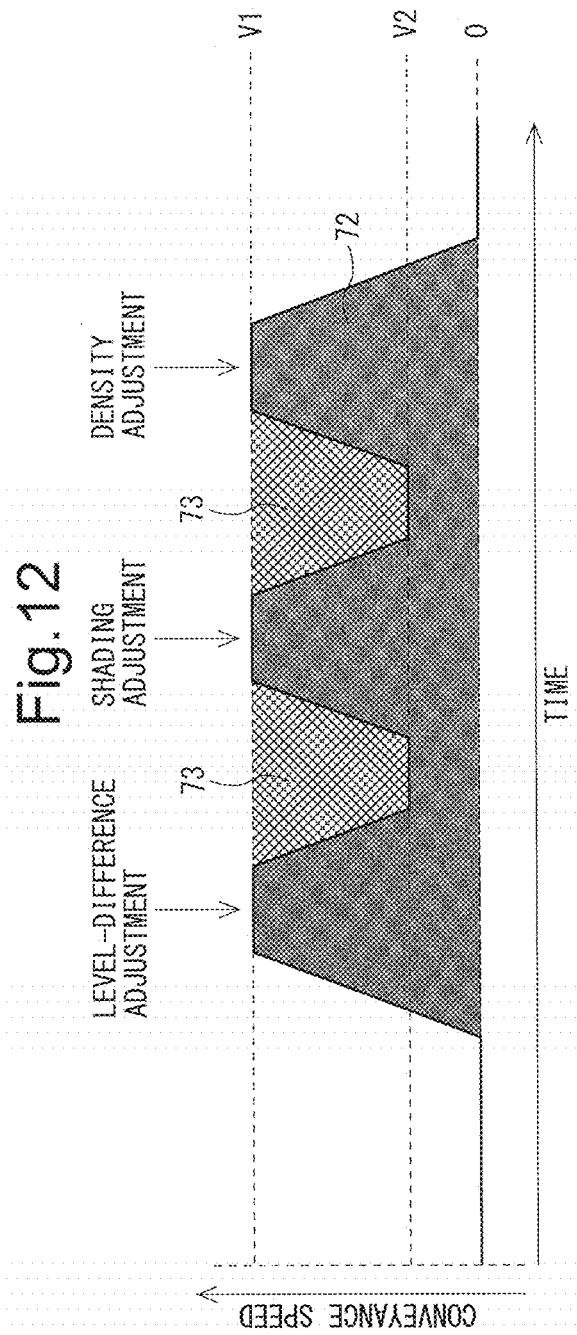

Fig.13

| CONDITION | FIRST SPEED (rpm) | DECELERATION | | ACCELERATION | | TOTAL TIME (s) | DISTANCE (m) |
|---|---|---|---|---|---|---|---|
| | | TIME (s) | DISTANCE (m) | TIME (s) | DISTANCE (m) | | |
| PERFORMING ACCELERATION/ DECELERATION | 150 | 2.5 | 3.1 | 20 | 25 | 22.5 | 28.1 |
| NOT PERFORMING ACCELERATION/ DECELERATION | 150 | | | 11.24 | | 11.24 | 28.1 |

11.24 — TIME REQUIRED FOR SETTING

Fig.23

| TARGET ADJUSTMENT ITEM | TIME REQUIRED FOR SETTING (s) | REDUCIBLE SPEED (mpm) | SECOND SPEED (mpm) |
|---|---|---|---|
| LEVEL-DIFFERENCE ADJUSTMENT | 100 | 150 | 0 |
| SHADING ADJUSTMENT | 105 | 150 | 0 |
| DENSITY ADJUSTMENT | 15 | 100 | 50 |
| ICC PROFILE CREATION PROCESS | | | |

84 85 86

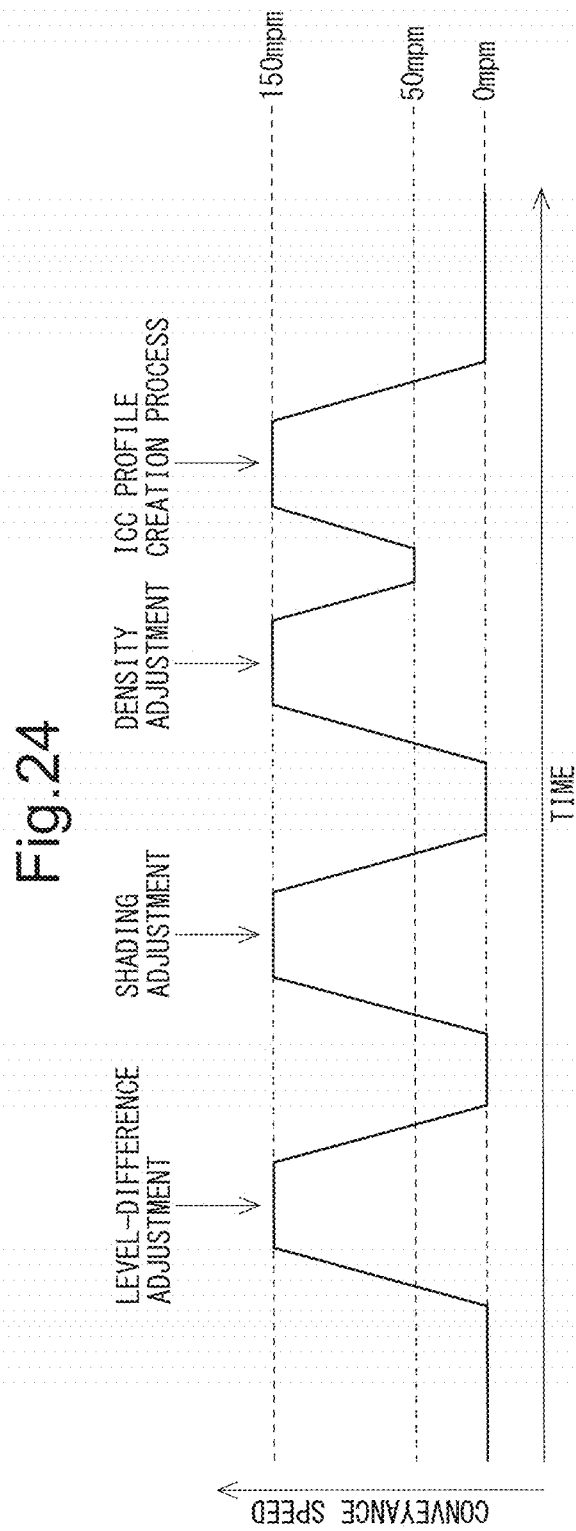

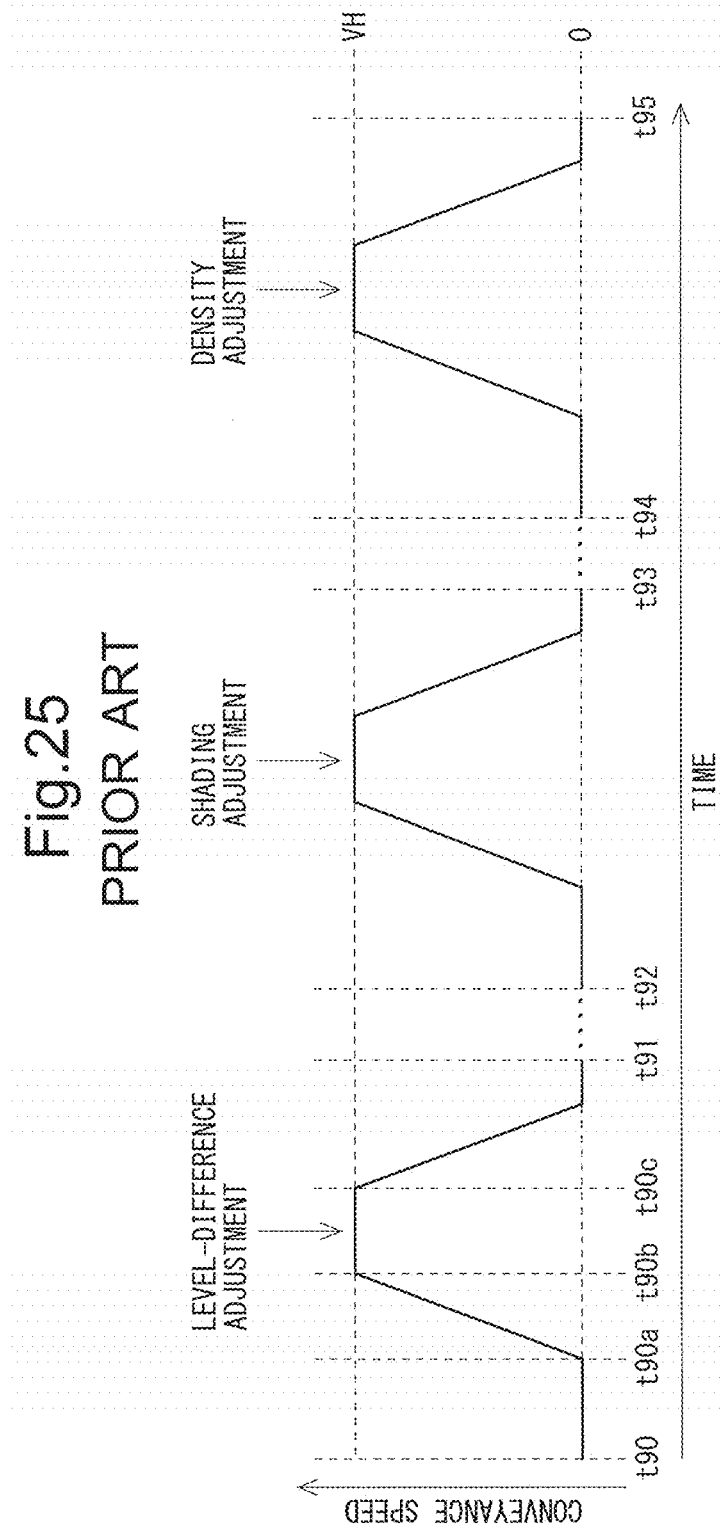

PRINTING APPARATUS AND BATCH ADJUSTMENT METHOD THEREFOR

BACKGROUND OF THE INVENTION

Field of the Invention

The present invention relates to a printing apparatus that performs printing by ejecting ink from a nozzle, and an adjustment method therefor.

Description of Related Art

There has been known an inkjet printing apparatus that performs printing by ejecting ink onto a base material (print paper or the like) by heat or pressure. The printing unit of the inkjet printing apparatus is provided with, for example, a plurality of inkjet heads (print heads) extending in a direction orthogonal to a conveyance direction of a base material for each color of ink. Each inkjet head includes many nozzles for ejecting ink. By performing printing on the roll paper using the printing unit with the configuration as described above, high-speed printing in a one-pass method has been implemented. Thus, inkjet printing apparatuses have been widely employed, especially for on-demand printing.

When printing is performed by such an inkjet printing apparatus, various adjustments are made so as to obtain good printing quality. Specifically, before printing for actually obtaining the target printed matter (printing based on print data) (hereinafter referred to as "actual printing") is executed, an adjustment process including calculation, setting, and the like of adjustment data (e.g., correction values) is performed, the calculation, the setting, and the like being corresponding to the results of printing an inspection chart and reading the printed image of the inspection chart by an image sensor.

FIG. 25 is a diagram for explaining a conventional adjustment process performed in the inkjet printing apparatus. Here, attention is focused on a case where adjustments for three target adjustment items (level-difference adjustment, shading adjustment, and density adjustment) are performed. The level-difference adjustment is intended to correct a deviation (level difference) between the inkjet heads (print heads) caused by differences in type and thickness of a base material used and a difference in printing mode, and is an operation to adjust the ink ejection timing for each appropriate adjustment unit (e.g., inkjet head unit or nozzle unit). The shading adjustment is intended to reduce the variation in density between the inkjet heads. Specifically, the shading adjustment is an operation to measure a density of a portion corresponding to each nozzle by printing a correction chart of a predetermined density and then optically reading the correction chart, and correct the ink ejection amount for each nozzle in accordance with the difference between the density obtained by the measurement and the predetermined density so as to obtain the print result of the same density in all the nozzles, thereby reducing the density unevenness. The density adjustment is intended to adjust the maximum density and intermediate density of each ink color, such as cyan color (C color), magenta color (M color), yellow color (Y color), and black color (K color) and is an operation to adjust data of a gradation correction table for each ink color.

FIG. 25 shows a change in conveyance speed (a speed at which the base material is conveyed) in a period during which the adjustment process is being performed. Note that VH represents a normal printing speed (a conveyance speed during normal printing). The head of the arrow for each of the level-difference adjustment, the shading adjustment, and the density adjustment indicates one time point in a period during which an inspection chart corresponding to each adjustment is printed.

First, at time point t90, an operator presses an adjustment start button for instructing the execution of the level-difference adjustment. Thereby, the printing machine body of the inkjet printing apparatus starts operation. When printing on the base material becomes possible (at time point t90a), such as when a temperature of a drying unit for drying the base material after printing becomes appropriate, the conveyance speed starts increasing gradually. When the conveyance speed reaches the normal printing speed VH at time point t90b, the inspection chart for the level-difference adjustment is printed. Then, after the printed image of the inspection chart is read by the image sensor, the conveyance speed starts decreasing gradually at time point t90c, and the operation of the printing machine body stops at time point t91. After time point t90c, adjustment data is calculated and set in accordance with the result of reading the printed image of the inspection chart. Note that the adjustment data are calculated and set by, for example, a print controller functioning as a controller for the inkjet printing apparatus.

Thereafter, at time point t92, the operator presses an adjustment start button for instructing the execution of the shading adjustment. Thereby, a similar operation to that in the level-difference adjustment is performed, and the operation of the printing machine body stops at time point t93. Further, at time point t94, the operator presses an adjustment start button for instructing the execution of the density adjustment. Thereby, a similar operation to that in the level-difference adjustment is performed, and the operation of the printing machine body stops at time point t95.

As above, the adjustments are performed for the plurality of target adjustment items one by one based on the operator's operation. By performing the adjustment process before the execution of the actual printing in this manner, a high-quality printed matter can be obtained.

Note that the following related art documents are known in connection with the present invention. WO 2018/225489 A discloses an invention of an image forming apparatus that enables appropriate adjustment of ejection droplet amounts for a plurality of liquid ejection heads. In the image forming apparatus, for example, the conveyance speed during the printing of a density inspection chart is made lower than the conveyance speed during normal image printing. Specifically, the larger the number of inkjet heads that eject the same color ink, the lower the conveyance speed during the printing of the density inspection chart. Hence the ejection droplet amount is appropriately adjusted regardless of the number of liquid ejection heads.

As described above, in the conventional inkjet printing apparatus, the adjustments are performed for the plurality of target adjustment items one by one based on the operator's operation. In this regard, in a case in which the adjustments for the plurality of target adjustment items are executed in an inappropriate order, a favorable adjustment is not performed depending on the target adjustment item. For example, in a case in which the shading adjustment is executed before the execution of the level-difference adjustment, the amount of ink ejected from each nozzle is adjusted in a state where the timing to eject ink from each nozzle has not been adjusted. This causes the density of the image obtained by the actual printing to differ from the desired density. Further, for example, in a case in which the density adjustment is executed before the execution of the shading adjustment, the density varies depending on the position of the head. From the above, at the time of executing the adjustment process, it is necessary to consider the order of adjustments for the plurality of target adjustment items. That is, for the plurality of target adjustment items, the adjustments need to be executed one by one in consideration of the order of adjustment. This makes the operation complex and the operation burden for the adjustment process extremely large for the operator.

Further, due to the need for executing the adjustments for the plurality of target adjustment items one by one as described above, the operation of "activating the printing machine body, printing the inspection chart, and stopping the printing machine body" is repeated the number of times equal to the number of target adjustment items. Moreover, the operator needs to give an instruction of execution for each target adjustment item. Therefore, a great deal of time is required to execute the adjustment processes. Furthermore, the operation of "activating the printing machine body, increasing the conveyance speed, printing the inspection chart, decreasing the conveyance speed, and stopping the printing machine body" is repeated, resulting in a large amount of waste paper.

Note that WO 2018/225489 give no description of the operator's operation for the adjustment process.

SUMMARY OF THE INVENTION

In view of the above circumstances, an object of the present invention is to provide a printing apparatus capable of executing adjustment processes to be executed before printing based on print data in a short time while reducing waste paper as compared to the related art by a simple operation.

One aspect of the present invention is directed to a printing apparatus including:
  a conveyance mechanism configured to convey a base material;
  a printing unit configured to perform printing on the base material by ejecting ink;
  a reading unit configured to read a printed image obtained by printing by the printing unit;
  a conveyance control unit configured to control a conveyance speed that is a speed at which the conveyance mechanism conveys the base material; and
  a printing condition setting unit configured to set a printing condition, wherein
  a batch adjustment process of performing a plurality of times of adjustment processes related to printing in succession based on one instruction from an outside is executable,
  one adjustment process includes a chart printing process in which the printing unit prints an inspection chart corresponding to a target adjustment item, a chart reading process in which the reading unit reads a printed image of the inspection chart, and a printing condition setting process in which the printing condition setting unit sets a printing condition based on read data obtained by the chart reading process,
  the conveyance control unit maintains the conveyance speed at a first speed in a period when the chart printing process is performed and a period when the chart reading process is performed, and
  the conveyance control unit decreases the conveyance speed to a second speed lower than the first speed after an end of the chart reading process in an adjustment process except for an adjustment process that is performed last in the batch adjustment process, and increases the conveyance speed to the first speed before a start of the chart printing process in an adjustment process that is performed next.

According to such a configuration, the printing apparatus is configured to be able to execute a batch adjustment process of performing a plurality of times of adjustment processes in a batch based on one instruction from outside. The operator does not need to instruct execution for each adjustment process and does not need to consider the order of execution of the adjustment processes. From the above, the adjustment processes related to printing can be executed in a short time by a simple operation. Moreover, the conveyance speed is not maintained at a constant speed throughout the period during which the adjustment process is being performed. In a period from the end of the chart reading process in an adjustment process except for an adjustment process that is performed last until the start of the chart printing process in an adjustment process that is performed next, the conveyance speed is lower than in a period during which the chart printing process is being performed and a period during which the chart reading process is being performed. By increasing and decreasing the conveyance speed in a period during which the batch adjustment process is being executed as above, it is possible to reduce waste paper as compared to the related art. The reduction of waste paper in this way can contribute to the achievement of the Sustainable Development Goals (SDGs). As above, there is implemented a printing apparatus capable of executing adjustment processes to be executed before actual printing (printing based on print data) in a short time while reducing waste paper as compared to the related art by a simple operation.

Another aspect of the present invention is directed to an adjustment method for a printing apparatus including a conveyance mechanism configured to convey a base material, a printing unit configured to perform printing on the base material by ejecting ink, a reading unit configured to read a printed image obtained by printing by the printing unit, a conveyance control unit configured to control a conveyance speed being a speed at which the conveyance mechanism conveys the base material, and a printing condition setting unit configured to set a printing condition, the adjustment method including:
  an adjustment instruction step of instructing, by an operator, the printing apparatus to execute a batch adjustment process; and
  a plurality of times of adjustment steps of repeatedly performing, by the printing apparatus, an adjustment process related to printing based on an instruction by the adjustment instruction step, wherein
  the adjustment step at each time includes
  an acceleration step of increasing the conveyance speed by the conveyance control unit,
  a chart printing step of printing an inspection chart corresponding to a target adjustment item by the printing unit,
  a chart reading step of reading a printed image of the inspection chart by the reading unit,
  a deceleration step of decreasing the conveyance speed by the conveyance control unit, and
  a printing condition setting step of setting, by the printing condition setting unit, a printing condition based on read data obtained in the chart reading step, in the acceleration step included in the adjustment step for a first time, the conveyance control unit increases the conveyance speed from 0 to a first speed, in the acceleration step included in the adjustment step except for the first time, the conveyance control unit increases the conveyance speed from a second speed lower than the first speed to the first speed, the chart printing step and the chart reading step included in the adjustment step at each time are performed in a state where the conveyance speed is maintained at the first speed by the conveyance control unit, in the deceleration step included in the adjustment step except for a last time, the conveyance control unit decreases the conveyance speed from the first speed to the second speed, and in the deceleration step included in the adjustment step for the last time, the conveyance control unit decreases the conveyance speed from the first speed to 0.

Still another aspect of the present invention is directed to a printing apparatus including:

a conveyor configured to convey a base material;

an inkjet head group configured to perform printing on the base material by ejecting ink;

a reading device configured to read a printed image obtained by printing by the inkjet head group;

a conveyance controller configured to control a conveyance speed that is a speed at which the conveyor conveys the base material; and a processor configured to set a printing condition, wherein a batch adjustment process of performing a plurality of times of adjustment processes related to printing in succession based on one instruction from an outside is executable, one adjustment process includes a chart printing process in which the inkjet head group prints an inspection chart corresponding to a target adjustment item, a chart reading process in which the reading device reads a printed image of the inspection chart, and a printing condition setting process in which the processor sets a printing condition based on read data obtained by the chart reading process, the conveyance controller maintains the conveyance speed at a first speed in a period when the chart printing process is performed and a period when the chart reading process is performed, and the conveyance controller decreases the conveyance speed to a second speed lower than the first speed after an end of the chart reading process in an adjustment process except for an adjustment process that is performed last in the batch adjustment process, and increases the conveyance speed to the first speed before a start of the chart printing process in an adjustment process that is performed next.

These and other objects, features, modes, and advantageous effects of the present invention will become more apparent from the following detailed description of the present invention with reference to the accompanying drawings.

BRIEF DESCRIPTION OF THE DRAWINGS

FIG. 5 is a block diagram showing a schematic functional configuration of a control unit implemented by executing a print control program in the print controller in the embodiment;

FIG. 6 is a flowchart showing a flow of a batch adjustment process in the embodiment;

FIG. 7 is a flowchart showing the flow of the batch adjustment process in the embodiment;

FIG. 8 is a flowchart showing a flow of an adjustment process for one target adjustment item in the embodiment;

FIG. 9 is a waveform diagram for describing a change in conveyance speed in the embodiment;

FIG. 10 is a diagram for explaining the timing to start increasing the conveyance speed in the embodiment;

FIG. 11 is a diagram for explaining a reduction of waste paper by performing acceleration and deceleration in the embodiment;

FIG. 12 is a diagram for explaining the reduction of waste paper by performing acceleration and deceleration in the embodiment;

FIG. 13 is a diagram for explaining a simulation regarding the occurrence of waste paper in the embodiment;

FIG. 23 is a diagram for explaining a reducible speed and the like for each target adjustment item in a seventh modification of the embodiment;

FIG. 24 is a waveform diagram showing a change in conveyance speed in the seventh modification of the embodiment; and FIG. 25 is a diagram for explaining a conventional adjustment process performed in the inkjet printing apparatus.

DETAILED DESCRIPTION OF PREFERRED EMBODIMENT

An embodiment of the present invention will be described below with reference to the accompanying drawings.

<1. Overall Configuration of Printing System>

Figure 1:
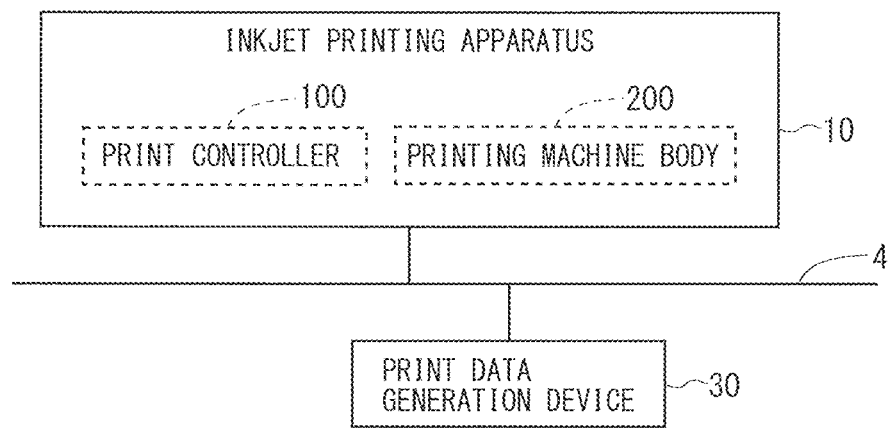
FIG. 1 is an overall configuration diagram of a printing system according to an embodiment of the present invention.

FIG. 1 is an overall configuration diagram of a printing system according to an embodiment of the present invention. The printing system includes an inkjet printing apparatus 10 and a print data generation device 30. The inkjet printing apparatus 10 and the print data generation device 30 are connected to each other through a local-area network (LAN) 4. The print data generation device 30 generates print data by performing a raster image processor (RIP) process or the like to submitted data such as a portable document format (PDF) file. The print data generated by the print data generation device 30 is transmitted to the inkjet printing apparatus 10 through the LAN 4. The inkjet printing apparatus 10 outputs a printed image to print paper, which is a base material, based on the print data transmitted from the print data generation device 30 without using a printing plate. The inkjet printing apparatus 10 includes a printing machine body 200, and a print controller 100 for controlling the operation of the printing machine body 200.

<2. Configuration of Inkjet Printing Apparatus>

Figure 2:
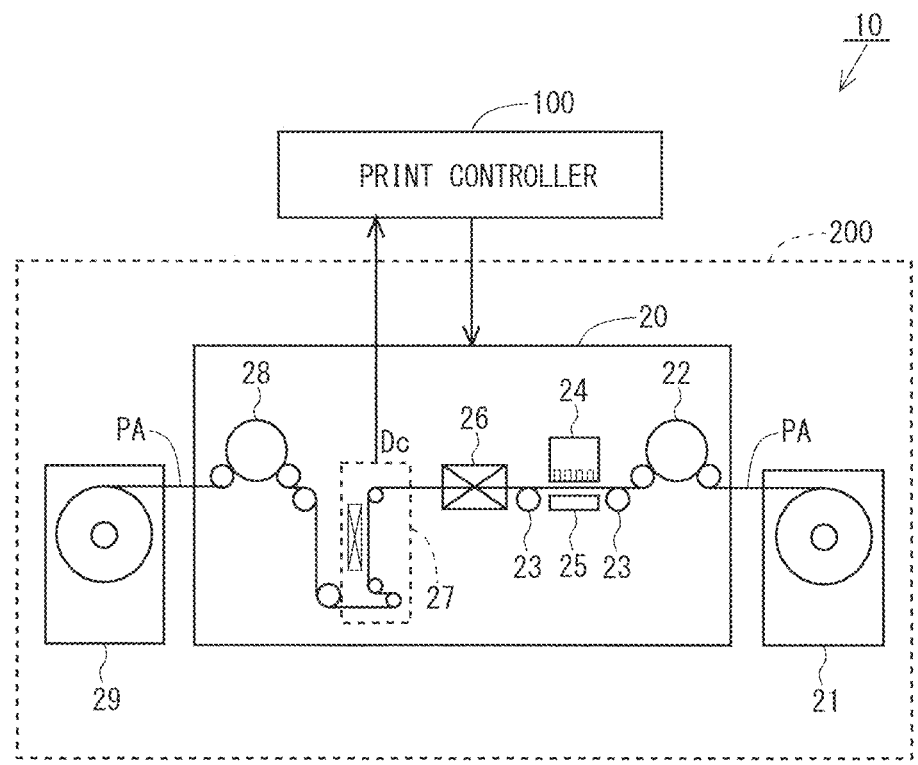
FIG. 2 is a schematic diagram showing a configuration example of an inkjet printing apparatus in the present invention.

FIG. 2 is a schematic diagram showing a configuration example of the inkjet printing apparatus 10. As described above, the inkjet printing apparatus 10 includes the print controller 100 and the printing machine body 200.

The printing machine body 200 includes a paper feeding unit 21 for supplying print paper (e.g., roll paper) PA, a printing mechanism 20 for performing printing on the print paper PA, and a paper winding unit 29 for winding the print paper PA after printing. The printing mechanism 20 includes a first drive roller 22 for conveying the print paper PA to the inside, a plurality of support rollers 23 for conveying the print paper PA inside the printing mechanism 20, a printing unit (inkjet head group) 24 for performing printing by ejecting ink onto the print paper PA, a cleaning mechanism 25 for performing cleaning (e.g., suction of ink from the nozzle or wiping of the nozzle surface) of the printing unit 24, a drying unit 26 for drying the print paper PA after printing, an imaging unit (image reader) 27 for capturing a printed image (print paper PA after printing), and a second drive roller 28 for outputting the print paper PA from the inside of the printing mechanism 20. As the imaging unit 27, for example, a contact image sensor (CIS) using a complementary metal-oxide-semiconductor (CMOS) is employed.

The print controller 100 controls the operation of the printing machine body 200 having the configuration as above. When a printout instruction command is given to the print controller 100, the print controller 100 controls the operation of the printing machine body 200 so that the print paper PA is conveyed from the paper feeding unit 21 to the paper winding unit 29. Then, first, printing is performed on the print paper PA by the printing unit 24, next, the print paper PA is dried by the drying unit 26, and finally, a printed image is captured by the imaging unit 27 as necessary. Further, the cleaning of the printing unit 24 by the cleaning mechanism 25 is performed as necessary. In the present embodiment, imaging data (read data) Dc obtained by capturing the printed image by the imaging unit 27 is transmitted to the print controller 100.

Figure 3:
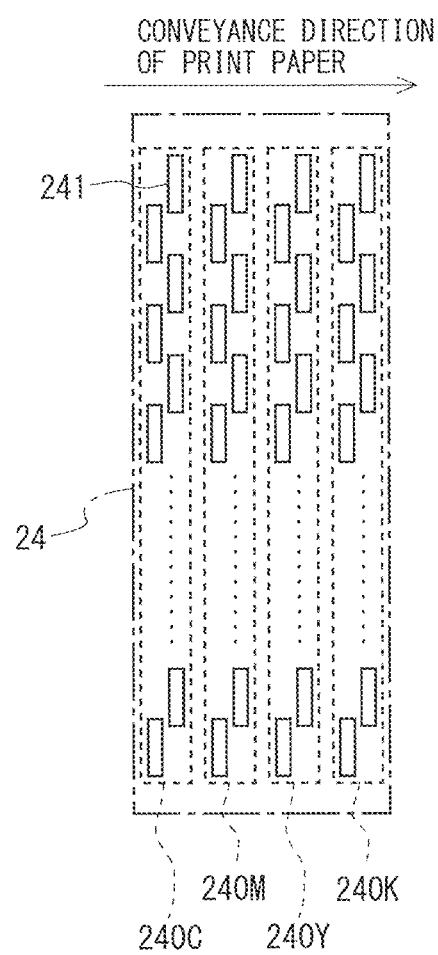
FIG. 3 is a plan view showing a configuration example of a printing unit in the embodiment.

FIG. 3 is a plan view showing a configuration example of the printing unit 24. As shown in FIG. 3, the printing unit 24 includes inkjet head rows 240C, 240M, 240Y, and 240K of cyan color (C color), magenta color (M color), yellow color (Y color), and black color (K color) arranged in a row in the conveyance direction of the print paper PA. Each inkjet head row is formed of a plurality of inkjet heads (print heads) 241 arranged in a staggered manner. Each inkjet head 241 includes many nozzles that eject ink. Each nozzle of the inkjet head 241 included in the C-color inkjet head row 240C ejects the C-color ink, each nozzle of the inkjet head 241 included in the M-color inkjet head row 240M ejects the M-color ink, each nozzle of the inkjet head 241 included in the Y-color inkjet head row 240Y ejects the Y-color ink, and each nozzle of the inkjet head 241 included in the K-color inkjet head row 240K ejects the K-color ink.

<3. Hardware Configuration of Print Controller>

Figure 4:
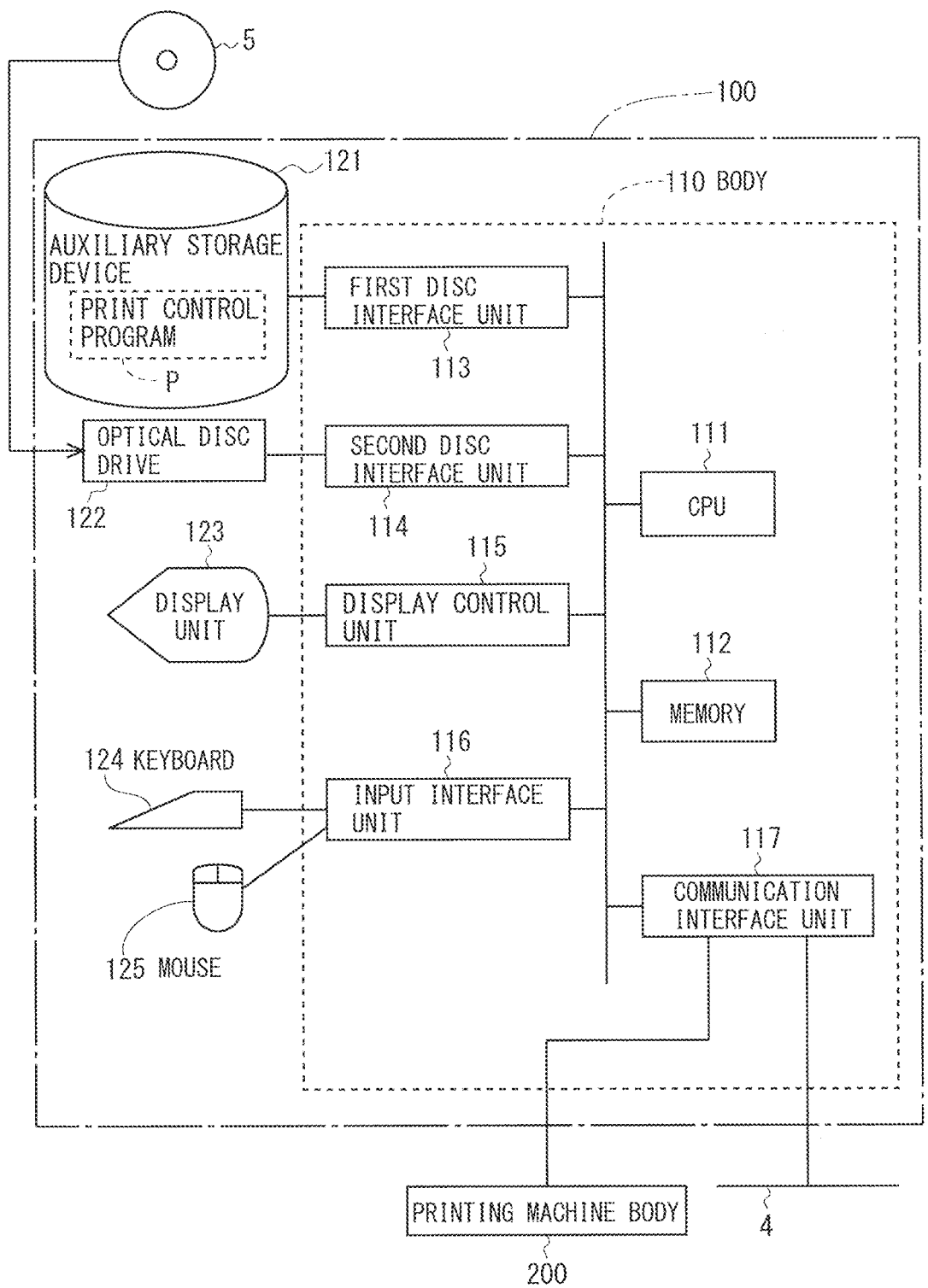
FIG. 4 is a block diagram showing a hardware configuration of a print controller in the embodiment.

FIG. 4 is a block diagram showing a hardware configuration of the print controller 100. As shown in FIG. 4, the print controller 100 includes a body 110, an auxiliary storage device 121, an optical disc drive 122, a display unit 123, a keyboard 124, a mouse 125, and the like. The body 110 includes a central processing unit (CPU) 111, a memory 112, a first disc interface unit 113, a second disc interface unit 114, a display control unit 115, an input interface unit 116, and a communication interface unit 117. The CPU 111, the memory 112, the first disc interface unit 113, the second disc interface unit 114, the display control unit 115, the input interface unit 116, and the communication interface unit 117 are connected to each other via a system bus. The auxiliary storage device 121 is connected to the first disc interface unit 113. The optical disc drive 122 is connected to the second disc interface unit 114. The display unit (display device) 123 is connected to the display control unit 115. The keyboard 124 and the mouse 125 are connected to the input interface unit 116. The printing machine body 200 is connected to the communication interface unit 117 via a communication cable. The communication interface unit 117 is connected to the LAN 4. The auxiliary storage device 121 is a magnetic disk device or the like. The optical disc 5 as a computer-readable recording medium such as a compact disc read-only memory (CD-ROM) or a digital versatile disc (DVD)-ROM is inserted into the optical disc drive 122. The display unit 123 is a liquid crystal display or the like. The display unit 123 is used to display information desired by an operator. The keyboard 124 and the mouse 125 are used by the operator to input instructions to the print controller 100.

The auxiliary storage device 121 stores a print control program (a program for controlling the execution of a printing process by the printing machine body 200) P. The CPU 111 reads the print control program P stored in the auxiliary storage device 121 into the memory 112 and executes the program to achieve various functions of the print controller 100. The memory 112 includes a random-access memory (RAM) and a read-only memory (ROM). The memory 112 functions as a work area for the CPU 111 to execute the print control program P stored in the auxiliary storage device 121. Note that the print control program P is provided by being stored into the computer-readable recording medium (non-transitory recording medium). That is, for example, the user purchases the optical disc 5 as the recording medium of the print control program P, inserts the optical disc 5 into the optical disc drive 122, reads the print control program P from the optical disc 5, and installs the print control program P in the auxiliary storage device 121.

<4. Configuration of Control Unit>

FIG. 5 is a block diagram showing a schematic functional configuration of the control unit 150 implemented by the print controller 100 executing the print control program P. The control unit 150 schematically includes a printing condition setting unit 151, a conveyance control unit 152, a print control unit 153, a drying control unit 154, and an imaging control unit 155.

The printing condition setting unit 151 sets printing conditions to be referred to by the control unit 150 during printing. In the present embodiment, in a batch adjustment process to be described later, the printing condition setting unit 151 sets the printing condition based on the imaging data Dc obtained by capturing the printed image by the imaging unit 27 for each target adjustment item.

The conveyance control unit 152 controls the speed (conveyance speed) at which a conveyance mechanism 210 conveys the print paper PA. In the present embodiment, the conveyance mechanism 210 is implemented by the paper feeding unit 21, the first drive roller 22, the plurality of support rollers 23, the second drive roller 28, and the paper winding unit 29 (cf. FIG. 2).

The print control unit 153 controls the ejection of ink from each of the nozzles included in the inkjet heads 241 constituting the printing unit 24 in accordance with the set printing conditions. For example, the ink ejection timing and the ink ejection amount are controlled in accordance with the printing conditions. The drying control unit 154 controls a temperature (drying temperature) when the drying unit 26 dries the print paper PA. The imaging control unit 155 controls the timing to capture the printed image by the imaging unit 27.

<5. Batch Adjustment Process>

The inkjet printing apparatus 10 according to the present embodiment is provided with a function to execute a batch adjustment process of performing adjustment processes for a plurality of target adjustment items based on one operation of the operator. In other words, the inkjet printing apparatus according to the present embodiment is configured to be able to execute the batch adjustment process of performing a plurality of times of adjustment processes related to printing in succession based on one instruction from outside. The batch adjustment process will be described below.

In the present embodiment, the level-difference adjustment, the shading adjustment, and the density adjustment are performed in this order as the adjustment processes for the plurality of target adjustment items by the batch adjustment process. Concerning the density adjustment, it has been common in the past to separately perform a process of adjusting the density of a so-called "solid" and a process of adjusting the density of halftones, but in the present embodiment, it is assumed that both are performed together in the batch adjustment process.

<5.1 Flow of Process>

The flow of the batch adjustment process will be described with reference to FIGS. 6 and 7. First, an adjustment parameter for controlling the operation of the adjustment process for each target adjustment item is specified by the operator (step S100). The adjustment parameter is specified, for example, by specifying a target file. Examples of the adjustment parameter include the number of times the shading adjustment is repeated and a target density value that is a density value used as a reference during the density adjustment.

Next, a batch adjustment start button for instructing the execution of the batch adjustment process is pressed by the operator (step S110). An adjustment instruction step is implemented by this step S110. Note that the batch adjustment start button is included, for example, in a predetermined operation screen displayed on the display unit 123 of the print controller 100. After the batch adjustment start button is pressed, the printing machine body 200 starts operation (step S120). When printing on the print paper PA becomes possible regarding the printing machine body 200, such as when the temperature of the drying unit 26 becomes appropriate, the conveyance of the print paper PA by the conveyance mechanism 210 is started based on the control by the conveyance control unit 152, and the conveyance speed increases (step S130).

Thereafter, when the conveyance speed reaches a speed suitable for printing (hereinafter referred to as a "first speed" for convenience), an inspection chart for the level-difference adjustment is printed (step S140). Then, the imaging unit 27 captures the printed image of the inspection chart while the conveyance speed is maintained at the first speed (step S150). Note that the imaging data Dc obtained in step S150 is transmitted to the print controller 100.

After the capturing of the printed image of the inspection chart by the imaging unit 27 ends, the conveyance speed decreases based on the control by the conveyance control unit 152 (step S160). Hereinafter, the speed after the decrease in conveyance speed is referred to as a "second speed" for convenience. In the present embodiment, the conveyance speed does not decrease to 0. Therefore, in the present embodiment, the second speed is a speed larger than 0. In step S170, the printing condition setting unit 151 (cf. FIG. 5) performs the calculation and setting of adjustment data for the level-difference adjustment (the setting is setting of printing conditions based on the adjustment data, specifically, setting of ejection timing setting data, for example) based on the imaging data Dc obtained in step S150. In step S180, the conveyance speed increases based on the control by the conveyance control unit 152. Incidentally, typically, the process of step S170 is performed both during the decrease in conveyance speed and during the increase in conveyance speed. That is, typically, the process of step S170 is performed over the time from the start point of the decrease in conveyance speed to the end point of the increase in conveyance speed.

When the conveyance speed reaches the first speed, an inspection chart for the shading adjustment is printed (step S190). Then, the imaging unit 27 captures the printed image of the inspection chart while the conveyance speed is maintained at the first speed (step S200). Thereafter, the conveyance speed decreases to the second speed based on the control by the conveyance control unit 152 (step S210). In step S220, the printing condition setting unit 151 performs the calculation and setting of adjustment data for the shading adjustment (the setting is setting of printing conditions based on the adjustment data, specifically, setting of shading correction data, for example) based on the imaging data Dc obtained in step S200. In step S230, the conveyance speed increases to the first speed based on the control by the conveyance control unit 152. Note that, similarly to the process of step S170, the process of step S220 is performed both during the decrease in conveyance speed and during the increase in conveyance speed.

When the conveyance speed reaches the first speed, an inspection chart for the density adjustment is printed (step S240). Then, the imaging unit 27 captures the printed image of the inspection chart while the conveyance speed is maintained at the first speed (step S250). Thereafter, the conveyance speed decreases based on the control by the conveyance control unit 152 (step S260). In step S270, the printing condition setting unit 151 performs the calculation and setting of adjustment data for the density adjustment (the setting is setting of printing conditions based on the adjustment data, specifically, the data setting of a gradation correction table, for example) based on the imaging data Dc obtained in step S250. After the conveyance speed decreases to 0, the operation of the printing machine body 200 stops (step S280). Thus, the batch adjustment process ends.

As can be grasped from the above flow, a flow of the adjustment process for one target adjustment item (one adjustment process) is as shown in FIG. 8. First, the conveyance control unit 152 increases the conveyance speed from the second speed to the first speed (step S310). Thereafter, the printing unit 24 prints the inspection chart corresponding to the target adjustment items (step S320), and the imaging unit 27 captures the printed image of the printed inspection chart (step S330). Thereafter, the conveyance control unit 152 decreases the conveyance speed from the first speed to the second speed (step S340). The printing condition setting unit 151 performs the calculation of adjustment data and the setting thereof (the setting of printing conditions based on the adjustment data) based on the imaging data Dc obtained in step S330 (step S350). Note that an acceleration step is implemented by step S310, a chart printing step is implemented by step S320, a chart reading step is implemented by step S330, a deceleration step is implemented by step S340, and a printing condition setting step is implemented by step S350.

Hereinafter, a process in which the printing unit 24 prints the inspection chart corresponding to the target adjustment items as in the process of step S320 is referred to as a "chart printing process", a process in which the imaging unit 27 captures the printed image of the inspection chart as in the process of step S330 is referred to as a "chart imaging process", and a process in which the printing condition setting unit 151 sets printing conditions based on the imaging data Dc obtained by the chart imaging process as in the process of step S350 is referred to as a "printing condition setting process". In the present embodiment, the chart imaging process corresponds to the chart reading process.

<5.2 Change in Conveyance Speed>

Next, a change in conveyance speed will be described with reference to FIG. 9. At time point t00 when the operator presses the batch adjustment start button, the conveyance speed is 0. That is, the conveyance mechanism 210 is stopped. Thereafter, when printing on the print paper PA becomes possible at time point t01, the conveyance speed starts increasing gradually. When the conveyance speed reaches the first speed V1 at time point t02, the chart printing process and the chart imaging process for level-difference adjustment are performed. At time point t03 after the time point at which the chart imaging process ends, the conveyance speed starts decreasing gradually. At time point t04, the conveyance speed reaches the second speed V2. Thereafter, at time point t05, the conveyance speed starts increasing gradually. When the conveyance speed reaches the first speed V1 at time point t06, the chart printing process and the chart imaging process for the shading adjustment are performed. At time point t07 after the time point at which the chart imaging process ends, the conveyance speed starts decreasing gradually. At time point t08, the conveyance speed reaches the second speed V2. Thereafter, at time point t09, the conveyance speed starts increasing gradually. When the conveyance speed reaches the first speed V1 at time point t10, the chart printing process and the chart imaging process for the density adjustment are performed. At time point t11 after the time point at which the chart imaging process ends, the conveyance speed starts decreasing gradually. Then, the conveyance speed becomes 0 at time point t12. That is, the conveyance mechanism 210 stops.

As above, in the period during which the chart printing process is performed and the period during which the chart imaging process is performed, the conveyance speed is maintained at the first speed V1. The conveyance speed decreases from the first speed V1 to the second speed V2 after the end of the chart imaging process in the adjustment process (in the present embodiment, the level-difference adjustment and the shading adjustment) except for the adjustment process (in the present embodiment, the density adjustment) performed last in the batch adjustment process, and the conveyance speed increases from the second speed V1 to the first speed V1 before the start of the chart printing process in the adjustment process that is performed next.

<5.3 Timings to Start Acceleration and Deceleration>

The timings to start increasing and decreasing the conveyance speed will be described.

<5.3.1 about Deceleration>

If there is a change in conveyance speed when the imaging unit 27 captures the printed image of the inspection chart, then the accuracy of the imaging decreases. Therefore, in the period during which the printed image of the inspection chart is being captured, the conveyance speed should be maintained at the first speed V1, which is the speed when the inspection chart was printed. In order to reduce waste paper caused by the adjustment process, the timing to start deceleration is preferably as early as possible. From the above, it is preferable to start the decrease in conveyance speed at the time point when the chart imaging process ends (the time point when the capturing of the printed image of the inspection chart by the imaging unit 27 completely ends).

<5.3.2 about Acceleration>

The printing condition setting process in each adjustment process needs to end before the printing of the inspection chart is started in the next adjustment process. However, if the increase in conveyance speed starts after the printing condition setting process ends, then the time required for the adjustment process becomes long. In order to shorten the time required for the adjustment process, the printing condition setting process preferably ends immediately before the time point at which the printing of the inspection chart is started in the next adjustment process. In other words, the printing condition setting process preferably ends immediately before the conveyance speed reaches the first speed V1 by acceleration. Meanwhile, the execution of the printing condition setting process can start after the end of the chart imaging process, and the time required for the printing condition setting process (hereinafter referred to as "time required for setting") can be predicted in advance.

From the above, when two adjustment processes performed in succession are referred to as a "preceding adjustment process" and a "subsequent adjustment process", concerning before the start of the chart printing process in the subsequent adjustment process, it is preferable to start the increase in conveyance speed as follows (cf. FIG. 10). Assuming that the time required for setting is Ta and the time required for the conveyance speed to increase from the second speed V2 to the first speed V1 is Tu, the increase in conveyance speed is started at a time point (time point t21 in FIG. 10) when (Ta-Tu) time has elapsed from the end point (time point t20 in FIG. 10) of the chart imaging process in the preceding adjustment process. Then, the conveyance speed reaches the first speed V1 at the start point (time point t22 in FIG. 10) of the chart printing process in the subsequent adjustment process.

<5.4 Reduction of Waste Paper by Performing Acceleration and Deceleration>

The reduction of waste paper by decreasing and increasing the conveyance speed as described above during the execution of the batch adjustment process will be described. If the conveyance speed is maintained at the first speed V1 from the time point when the conveyance speed reaches the first speed V1 before the start of the chart printing process in the first adjustment process to the time point when the chart imaging process in the last adjustment process ends, then the length of the print paper PA used by the execution of the batch adjustment process (i.e., the length of the waste paper) is schematically represented by the area of the shaded portion denoted by reference numeral 71 in FIG. 11. This is because, in FIG. 11, the vertical axis represents the conveyance speed and the horizontal axis represents time. In contrast, in a case in which the decrease and increase in conveyance speed are repeated as described above, the length of the print paper PA used by the execution of the batch adjustment process is schematically represented by the area of the shaded portion denoted by reference numeral 72 in FIG. 12. From the above, in a case in which the decrease and increase in conveyance speed are repeated, as compared to a case in which the conveyance speed is maintained at the first speed V1, waste paper having a length corresponding to the area of the shaded portion denoted by reference numeral 73 in FIG. 12 is reduced. FIG. 13 is a diagram for explaining a simulation regarding the occurrence of waste paper. In this simulation, it is assumed that the first speed V1 is 150 mpm and the second speed V2 is 0.1 mpm (substantially 0 mpm).

First, attention is paid to a case in which the decrease and increase in conveyance speed are repeated (i.e., the case of "performing acceleration and deceleration"). It is assumed that the conveyance speed is decreased to the second speed V2 from a state where the conveyance speed is maintained at the first speed V1, and immediately thereafter, the conveyance speed is increased from the second speed V2 to the first speed V1. In this case, the time required for deceleration is 2.5 seconds, and the conveyance distance of the print paper during deceleration is 3.1 m. The time required for the acceleration is 20 seconds, and the conveyance distance of the print paper during the acceleration is 25 m. Thus, the time from the start point of deceleration to the end point of acceleration (total time) is 22.5 seconds, and the conveyance distance of the print paper during that time is 28.1 m.

Next, attention is paid to a case in which the conveyance speed is maintained at the first speed V1 (i.e., the case of "not performing acceleration or deceleration"). The first speed V1 is 150 mpm. Since 150 mpm is 2.5 m per second, the time required for the print paper to be conveyed 28.1 m while the conveyance speed is maintained at the first speed V1 is 11.24 (=28.1/2.5) seconds.

According to the above simulation, when the time required for setting is 11.24 seconds, the length of the waste paper (the amount of waste paper generated) is the same between the case of performing acceleration and deceleration and the case of not performing acceleration or deceleration. In the case of performing acceleration and deceleration, even when the time required for setting is longer than 11.24 seconds, the length of the waste paper is not larger than 28.1 m. In contrast, in the case of not performing acceleration or deceleration, the length of the waste paper increases (the amount of waste paper generated increases) as the time required for setting increases. For example, in a case where the time required for setting is 30 seconds, when the print paper is conveyed for 30 seconds at the first speed V1 (150 mpm), the conveyance distance of the print paper becomes 75 m, and hence the waste paper is reduced by 46.9 (=75-28.1) m by performing acceleration and deceleration. In addition, for example, in a case where the time required for setting is 60 seconds, when the print paper is conveyed for 60 seconds at the first speed V1 (150 mpm), the conveyance distance of the print paper becomes 150 m, and hence the waste paper is reduced by 121.9 (=150-28.1) m by performing acceleration and deceleration. Here, attention has been focused on one deceleration and acceleration, but as the number of repetitions of deceleration and acceleration increases, the effect of reducing waste paper by performing acceleration and deceleration becomes more remarkable.

For the target adjustment items for which the time required for setting exceeds 22.5 seconds, the adjustment time does not become longer by performing acceleration and deceleration than the case of not performing acceleration or deceleration. Note that the conveyance speed, the timings of acceleration and deceleration, and the like are actually determined in consideration of the distance from the printing unit 24 to the imaging unit 27.

Figure 14:
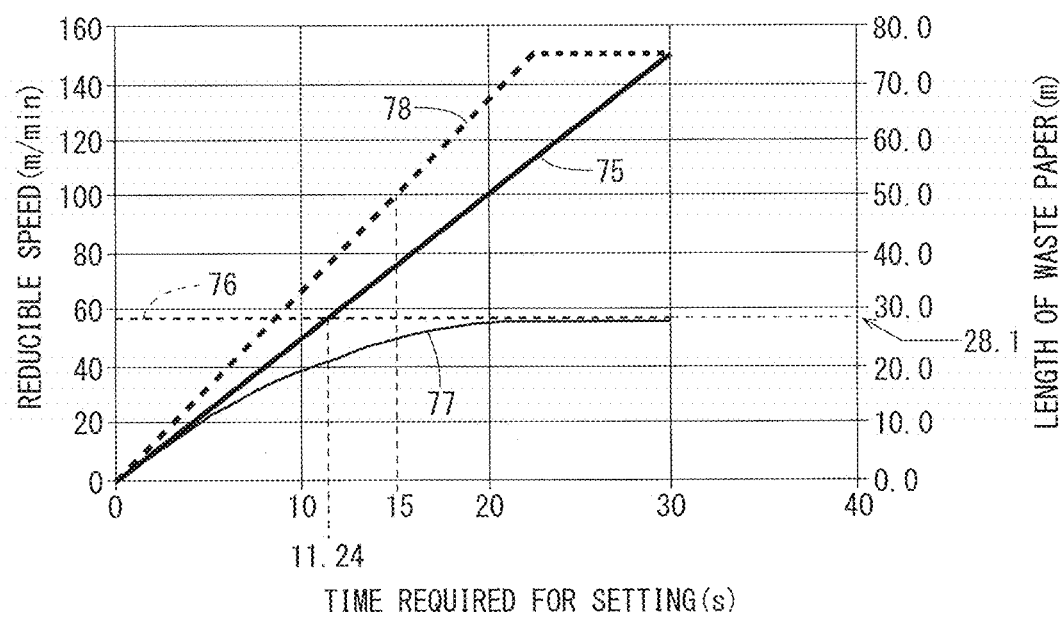
FIG. 14 is a diagram for explaining the length (generated amount) of waste paper in the embodiment.

FIG. 14 is a diagram for explaining the length of the waste paper (the amount of waste paper generated) in consideration of the results of the above simulation. In FIG. 14, the vertical axis for a thick solid line denoted by reference numeral 75, a thin dotted line denoted by reference numeral 76, and a thin solid line denoted by reference numeral 77 is the "length of waste paper", and the vertical axis for a thick dotted line denoted by reference numeral 78 is the "reducible speed".

In the case of "not performing acceleration or deceleration" shown in FIG. 13, the length of the waste paper is proportional to the length of the time required for setting. In this case, the relationship between the time required for setting and the length of the waste paper is represented by the thick solid line denoted by reference numeral 75, and there is a concern that the upper limit of the length of the waste paper is not fixed. In a case where the conveyance speed is decreased and increased between the end point of the chart imaging process in the preceding adjustment process and the start point of the chart printing process in the subsequent adjustment process regardless of the length of the time required for setting, the length of the waste paper is the same regardless of the length of the time required for setting. In this case, the relationship between the time required for setting and the length of the waste paper is represented by the thin dotted line denoted by reference numeral 76, and there is a disadvantage that a considerable amount (28.1 m) of waste paper is generated even when the time required for setting is remarkably short. Therefore, a possible method is that "the conveyance speed is not decreased and increased in a case in which the time required for setting is 11.24 seconds or less, and the conveyance speed is decreased and increased only in a case in which the time required for setting exceeds 11.24 seconds." According to this method, the relationship between the time required for setting and the length of the waste paper is represented by the thick solid line denoted by reference numeral 75 for the time required for setting of 11.24 seconds or less, and is represented by the thin dotted line denoted by reference numeral 76 for the time required for setting exceeding 11.24 seconds. By switching whether or not to perform the acceleration and deceleration of the conveyance speed in accordance with the length of the time required for setting in this manner, the length of the waste paper (the amount of waste paper generated) can be reduced.

Meanwhile, obtaining "the relationship between the time required for setting and the reducible speed" as indicated by the thick dotted line denoted by reference numeral 78 in FIG. 14 in advance makes it possible to further reduce the amount of waste paper generated. Note that this relationship is determined so that no waiting time (time from the end point of the printing condition setting process in the preceding adjustment process until the conveyance speed reaches the first speed V1) occurs at the start of the chart printing process in the subsequent adjustment process. In the example shown in FIG. 14, when the time required for setting is 15 seconds, the reducible speed is 100 mpm, and hence the conveyance speed can be decreased from 150 mpm to 50 mpm after the end of the chart imaging process.

That is, the second speed V2 is set to 50 mpm. By performing acceleration and deceleration based on the above relationship, the relationship between the time required for setting and the length of the waste paper is represented by the thin solid line denoted by reference numeral 77 in FIG. 14. In this manner, the second speed V2 is preferably set so as to minimize the amount of waste paper generated by the execution of the batch adjustment process. However, in the present embodiment, the second speed V2 after the end of the chart imaging process in the adjustment process except for the adjustment process that is performed last is set to the same speed (cf. FIG. 9). Therefore, for example, the second speed V2 is set based on the maximum one of the reducible speeds for the adjustment processes except for the adjustment process that is performed last.

<5.5 Second Speed>

Here, how the second speed V2 is determined will be described. In the present embodiment, the second speed V2 is determined so that the consumption amount of the print paper PA (i.e., the amount of waste paper generated) by the execution of the batch adjustment process is minimized. In this regard, focusing on two adjustment processes (the preceding adjustment process and the subsequent adjustment process described above) performed in succession, the conveyance distance of the print paper PA from the end point of the chart imaging process in the preceding adjustment process to the start point of the chart printing process in the subsequent adjustment process is schematically represented by the area of the shaded portion denoted by reference numeral 79 in FIG. 15.

Figure 15:
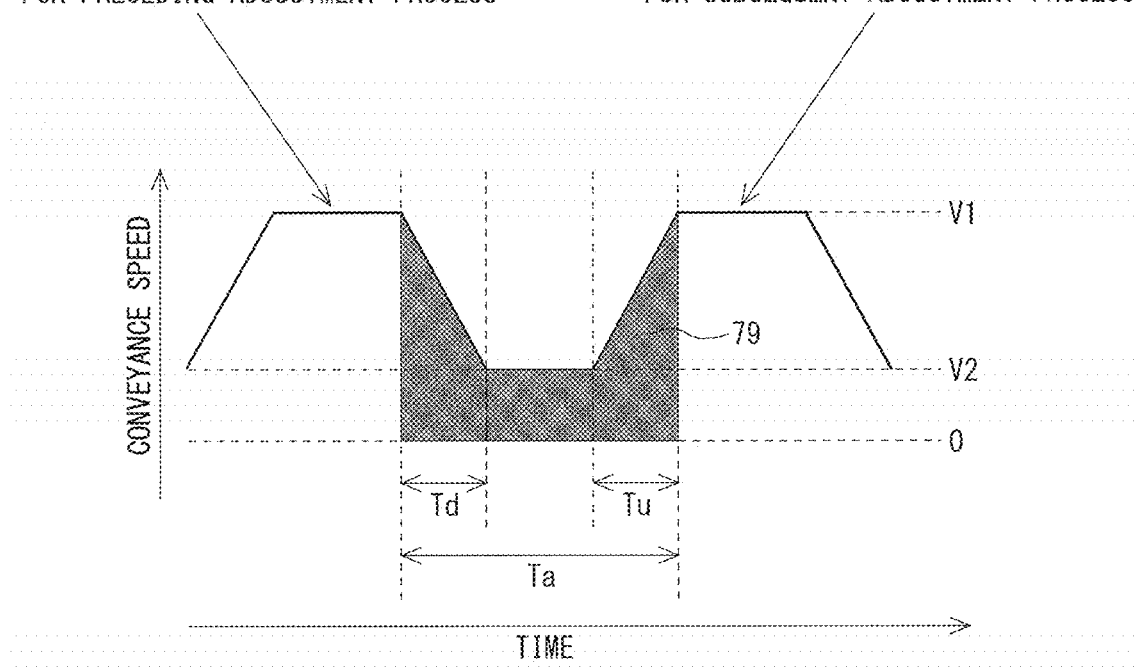
FIG. 15 is a diagram for explaining how the second speed is determined in the embodiment.

Assuming that the time required for the printing condition setting process (time required for setting) is Ta, the time required for the conveyance speed to decrease from the first speed V1 to the second speed V2 is Td, and the time required for the conveyance speed to increase from the second speed V2 to the first speed V1 is Tu, the conveyance distance L of the print paper PA from the end point of the chart imaging process in the preceding adjustment process to the start point of the chart printing process in the subsequent adjustment process is represented by the following equation (1) (cf. FIG. 15).

$$L = \frac{(V1 - V2) \times (Td - Tu)}{2} + (V2 \times Ta) \quad (1)$$

In the present embodiment, the second speed V2 is set so that the conveyance distance L of the print paper PA represented by the above equation (1) is minimized. In a case in which the speed that can be set as the second speed V2 is limited to a plurality of types of speeds, the speed that minimizes the conveyance distance L among the plurality of types of speeds is employed as the second speed V2.

<6. Effects>

According to the present embodiment, the inkjet printing apparatus 10 is configured to be able to execute the batch adjustment process of performing adjustment processes for a plurality of target adjustment items in a batch based on one instruction by the operator. The operator does not need to instruct the execution of the adjustment process for each target adjustment item and does not need to consider the order of execution of the adjustment processes. The operator only needs to press the batch adjustment start button. From the above, the adjustment processes related to printing can be executed in a short time by a simple operation. Moreover, the conveyance speed is not maintained at a constant speed throughout the period during which the adjustment process is being performed. The conveyance speed decreases in the period during which the printing condition setting process is being performed. Specifically, in the period from the end of the chart imaging process (chart reading process) in the adjustment process except for the adjustment process that is performed last until the start of the chart printing process in the adjustment process that is performed next, the conveyance speed is lower than that in the period during which the chart printing process is being performed and the period during which the chart imaging process (chart reading process) is being performed. By increasing and decreasing the conveyance speed in the period during which the batch adjustment process is being executed as above, it is possible to reduce waste paper as compared to the related art. The reduction of waste paper in this way can contribute to the achievement of the Sustainable Development Goals (SDGs). As above, according to the present embodiment, there is implemented the inkjet printing apparatus 10 capable of executing the adjustment processes to be executed before actual printing (printing based on print data transmitted from the print data generation device 30 to the inkjet printing apparatus 10) in a short time while reducing waste paper as compared to the related art by a simple operation.

<7. Modifications>

Modifications of the above embodiment will be described below.

<7.1 First Modification>

In the above embodiment, the second speed V2 is higher than 0. That is, in the above embodiment, when the conveyance of the print paper PA starts in the batch adjustment process, the conveyance of the print paper PA does not stop until the final adjustment process ends. However, the present invention is not limited thereto. In the present modification, the second speed V2 is 0.

Figure 16:
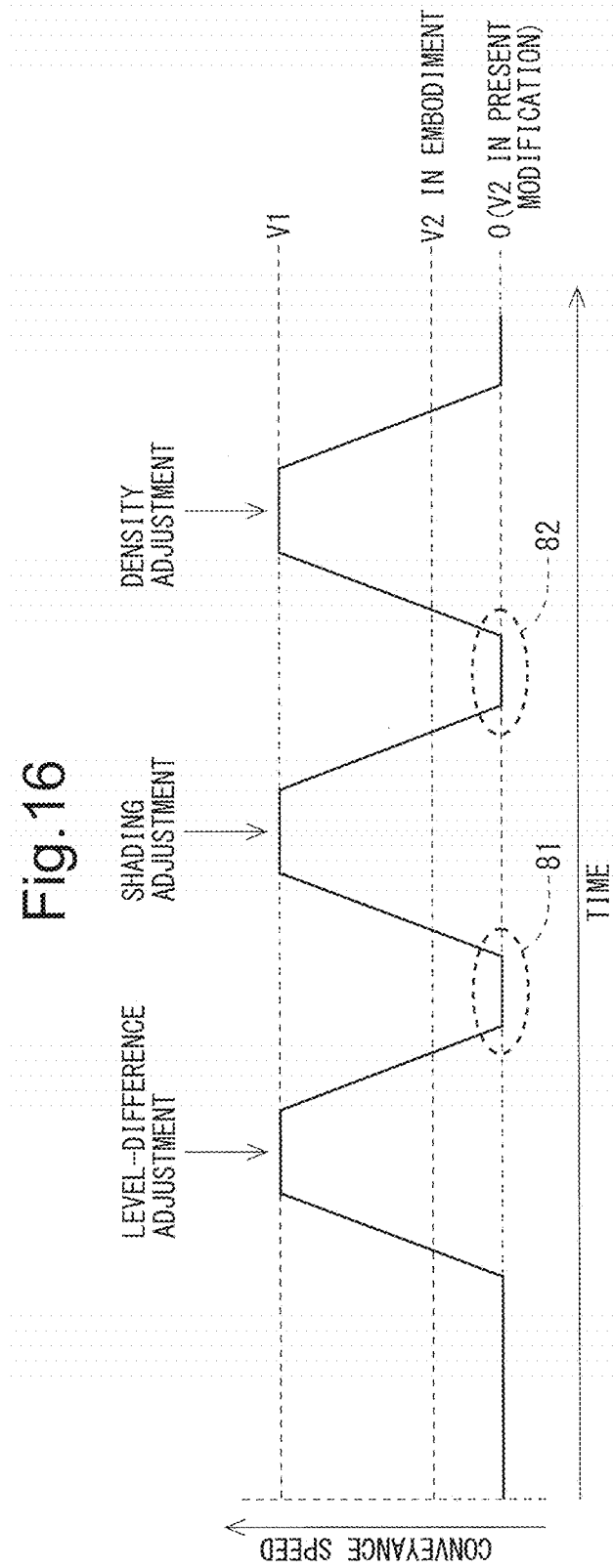
FIG. 16 is a waveform diagram showing a change in conveyance speed in a first modification of the embodiment.

FIG. 16 is a waveform diagram showing a change in conveyance speed in the present modification. As can be seen from a portion denoted by reference numeral 81 in FIG. 16, the conveyance speed decreases to 0 when the printing condition setting process for the level-difference adjustment is being performed, and as can be seen from a portion denoted by reference numeral 82 in FIG. 16, the conveyance speed decreases to 0 when the printing condition setting process for the shading adjustment is being performed. By stopping the conveyance of the print paper PA in the period when the printing condition setting process is performed as above, it is possible to reduce the waste paper more effectively.

<7.2 Second Modification>

In the above embodiment, the level-difference adjustment, the shading adjustment, and the density adjustment have been performed by the batch adjustment process. However, the types and the combination of the adjustment processes performed in the batch adjustment process are not limited thereto. Therefore, as a second modification of the above embodiment, an example will be described in which the level-difference adjustment, the shading adjustment, the density adjustment, and an ICC profile creation process (color profile creation process) are performed by the batch adjustment process. Note that the ICC profile is a file of a format defined by the International Color Consortium for color space conversion and is a file that defines the characteristics of a color space of a device. By converting color data using the ICC profile, it is possible to reproduce a color as faithfully as possible between different devices.

Figure 17:
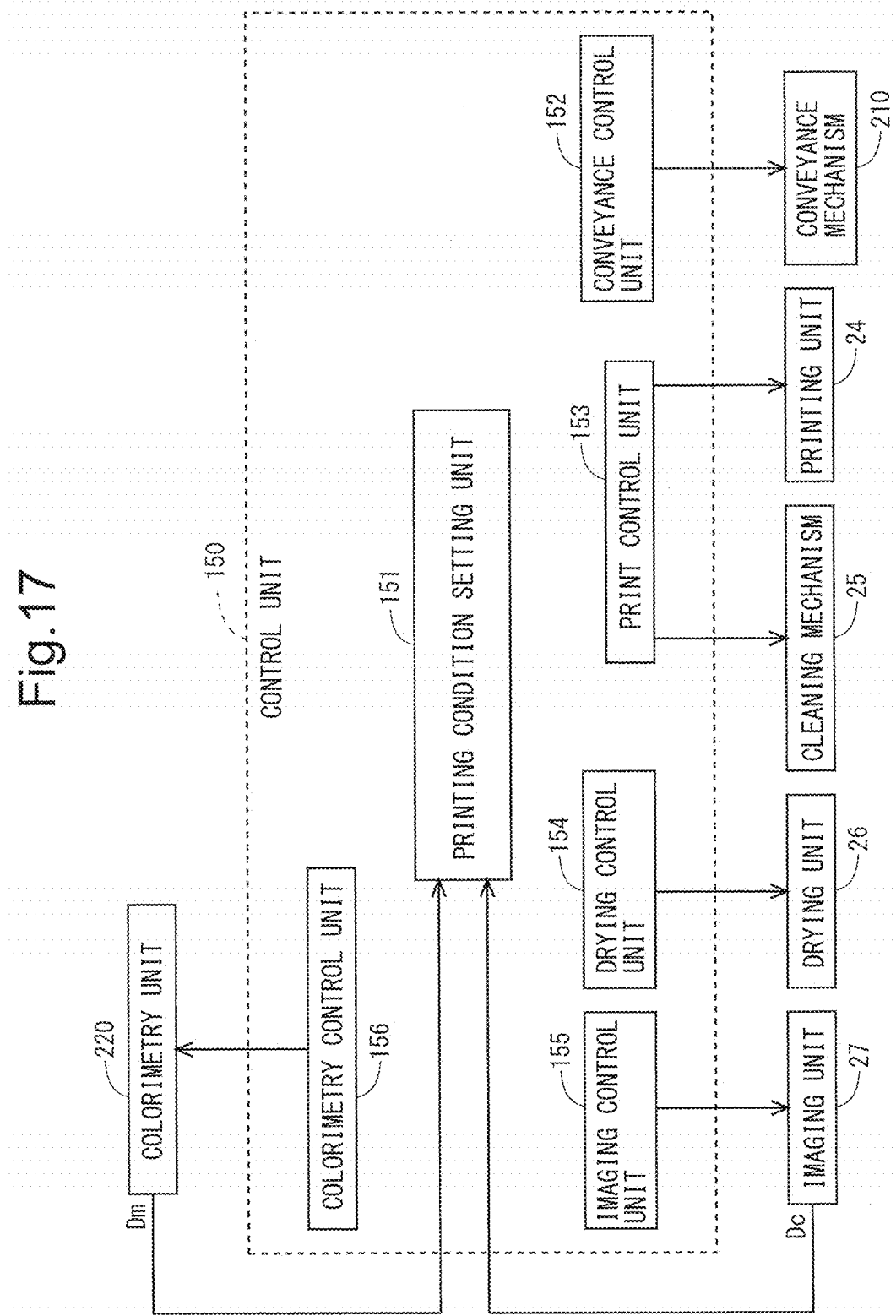
FIG. 17 is a block diagram showing a schematic functional configuration of a control unit in a second modification of the embodiment.

In the present modification, a colorimetry unit for performing colorimetry is provided inside the printing mechanism 20 constituting the printing machine body 200 of the inkjet printing apparatus 10. As the colorimetry unit, for example, an in-line colorimeter is employed. Note that the imaging unit 27 functions as a reading unit in the above embodiment, whereas the imaging unit 27 and the colorimetry unit function as a reading unit in the present modification. FIG. 17 is a block diagram showing a schematic functional configuration of the control unit 150 in the present modification. The control unit 150 in the present modification includes a colorimetry control unit 156 in addition to the components in the above embodiment (cf. FIG. 5). The colorimetry control unit 156 controls the timing of colorimetry of the printed image by the colorimetry unit 220. Note that colorimetric data Dm obtained by the colorimetry of the printed image by the colorimetry unit 220 is transmitted to the control unit 150 and referred to by the printing condition setting unit 151.

Figure 18:
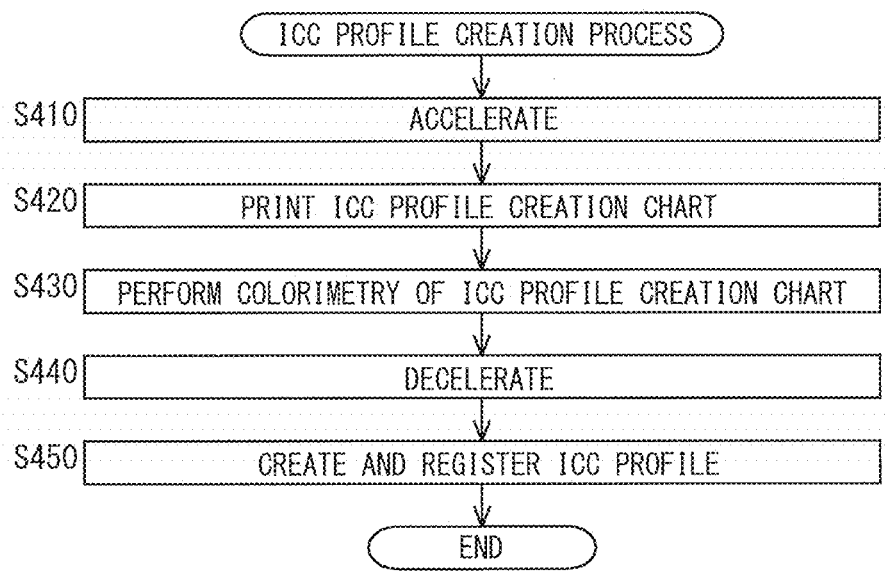
FIG. 18 is a flowchart showing a procedure of an ICC profile creation process in the second modification of the embodiment.

In the present modification, the level-difference adjustment, the shading adjustment, the density adjustment, and the ICC profile creation process are performed in this order as the adjustment processes for the plurality of target adjustment items by the batch adjustment process. The processes up to the density adjustment are performed in the same manner as in the above embodiment. However, after the chart imaging process in the density adjustment ends, the conveyance speed decreases to the second speed V2. Hereinafter, the procedure of the ICC profile creation process will be described with reference to the flowchart shown in FIG. 18.

First, the conveyance speed increases from the second speed V2 to the first speed V1 based on the control by the conveyance control unit 152 (step S410). Note that adjustment data for the density adjustment is calculated and set during a period when the conveyance speed is increasing. When the conveyance speed reaches the first speed V1, the printing unit 24 prints an ICC profile creation chart as an inspection chart (step S420). Then, the colorimetry unit performs the colorimetry of the ICC profile creation chart while the conveyance speed is maintained at the first speed V1 (i.e., a colorimetry process is performed) (step S430). Thereafter, the conveyance speed decreases to 0 based on the control by the conveyance control unit 152 (step S440). In step S450, the printing condition setting unit 151 creates an ICC profile and registers the ICC profile in a print workflow management system for managing the print workflow, based on the colorimetric data (read data) Dm obtained in step S430. Note that the process of step S450 is also performed during the decrease in conveyance speed.

In the present modification, the chart imaging process in each of the level-difference adjustment, the shading adjustment, and the density adjustment, and the colorimetry process in the ICC profile creation process correspond to the chart reading process.

According to the present modification, the ICC profile is also created by the batch adjustment process. As a result, the operation burden on the operator regarding the process required before the execution of the actual printing is reduced greatly.

<7.3 Third Modification>

In the above embodiment, it has been assumed that the adjustments for the predetermined target adjustment items are performed by the batch adjustment process. However, the present invention is not limited thereto. As in the present modification, the operator may be able to select the target adjustment items for which the adjustment processes are executed by the batch adjustment process. This will be described below.

Figure 19:
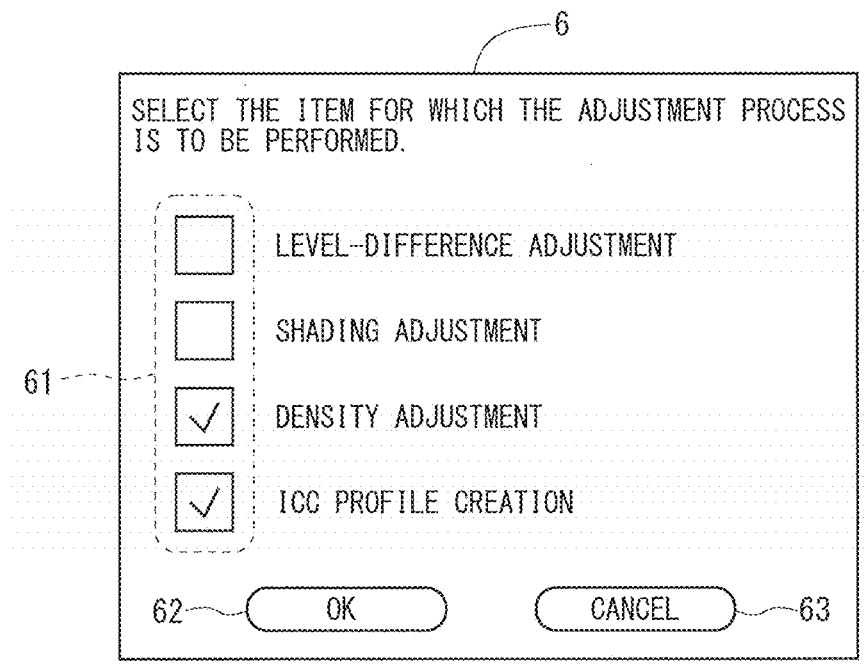
FIG. 19 is a diagram showing an example of a target adjustment item selection screen in a third modification of the embodiment.

In the present modification, the control unit 150 is provided with a target adjustment item selection unit for selecting, from outside, a target adjustment item as the target of the adjustment process by the batch adjustment process. The target adjustment item selection unit displays, for example, a target adjustment item selection screen 6 as shown in FIG. 19 on the display unit 123. The target adjustment item selection screen 6 includes check boxes 61 provided to have a one-to-one correspondence with a plurality of selectable target adjustment items, an OK button 62, and a cancel button 63. Before pressing the batch adjustment start button (i.e., before step S110 in FIG. 6), the operator uses the target adjustment item selection screen 6 to select a target adjustment item as the target of the adjustment process by the batch adjustment process. When the OK button 62 is pressed with the target adjustment items selected in the check box 61 and then the batch adjustment start button is pressed, the adjustment for the selected target adjustment item is performed by the batch adjustment process. When the cancel button 63 is pressed on the target adjustment item selection screen 6, the previous selection is maintained.

In the present modification, a priority order regarding the execution order is determined in advance for a plurality of target adjustment items that can be selected on the target adjustment item selection screen 6. Then, when the execution of the batch adjustment process is instructed after the target adjustment item as the target of the adjustment process is selected using the target adjustment item selection screen 6, the adjustment process for one or more target adjustment items selected using the target adjustment item selection screen 6 is performed in the order according to the priority order.

According to the present modification, it is possible to set only the target adjustment item requiring the adjustment process as the target of the batch adjustment process. For example, in a case where the type of print paper is the same as that in the previous time but the thickness of the print paper is different from that in the previous time, a target adjustment item that does not require re-adjustment when the type of print paper is not changed may be excluded from the target of the batch adjustment processes, and a target adjustment item that requires re-adjustment in accordance with the change in the thickness of the print paper may be set as the target of the batch adjustment process. As a result, unnecessary execution of the adjustment process is prevented, making it possible to prevent an increase in waste paper and shorten the time required for the adjustment process.

<7.4 Fourth Modification>

In the above embodiment, in the batch adjustment process, the adjustment process has been performed once for each target adjustment item. However, depending on the target adjustment items, it is preferable to repeat the adjustment process twice or more. For example, for the shading adjustment, the adjustment process is preferably repeated twice or more as necessary. Therefore, by including the number of repetitions of the shading adjustment in the adjustment parameter as described above, the adjustment process can be repeated twice or more for the shading adjustment in the batch adjustment process. According to the third modification, the operator can select the target adjustment items for which the adjustment processes are executed by the batch adjustment process. Therefore, as a fourth modification of the above embodiment, a case will be described in which only the shading adjustment is selected as the target of the batch adjustment process, and the shading adjustment is repeated twice during the batch adjustment process.

Figure 20:
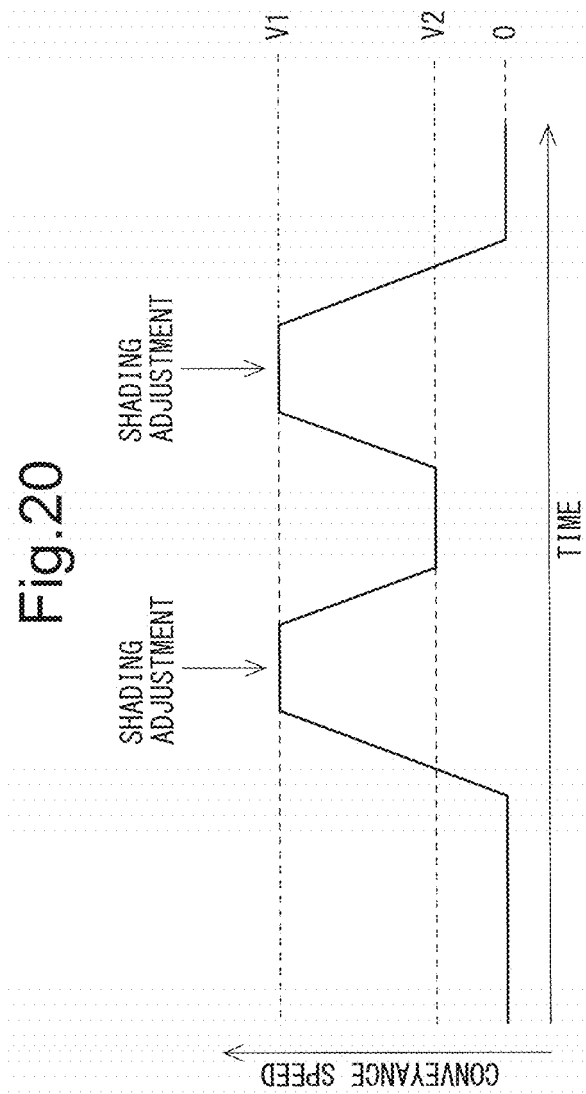
FIG. 20 is a waveform diagram showing a change in conveyance speed in a fourth modification of the embodiment.

FIG. 20 is a waveform diagram showing a change in conveyance speed in the present modification. As described above, the shading adjustment (adjustment process) is repeated twice in the batch adjustment process. The conveyance speed decreases after the end of the chart imaging process in the adjustment process for the first time, and then the conveyance speed increases until the chart printing process in the adjustment process for the second time is started. Even when the adjustment process for the same target adjustment item is performed in succession in this manner, the conveyance speed is decreased and increased similarly to the case where an adjustment process for a certain target adjustment item and an adjustment process for another target adjustment item are performed in succession (cf. the above embodiment).

<7.5 Fifth Modification>

Although related to the fourth modification, the adjustment process may be repeated twice or more only for one or some of the plurality of target adjustment items that are the targets of the batch adjustment process. Therefore, as a fifth modification of the above embodiment, a case will be described in which the level-difference adjustment, the shading adjustment, and the density adjustment are performed by the batch adjustment process, and the adjustment process is repeated twice only for the shading adjustment.

Figure 21:
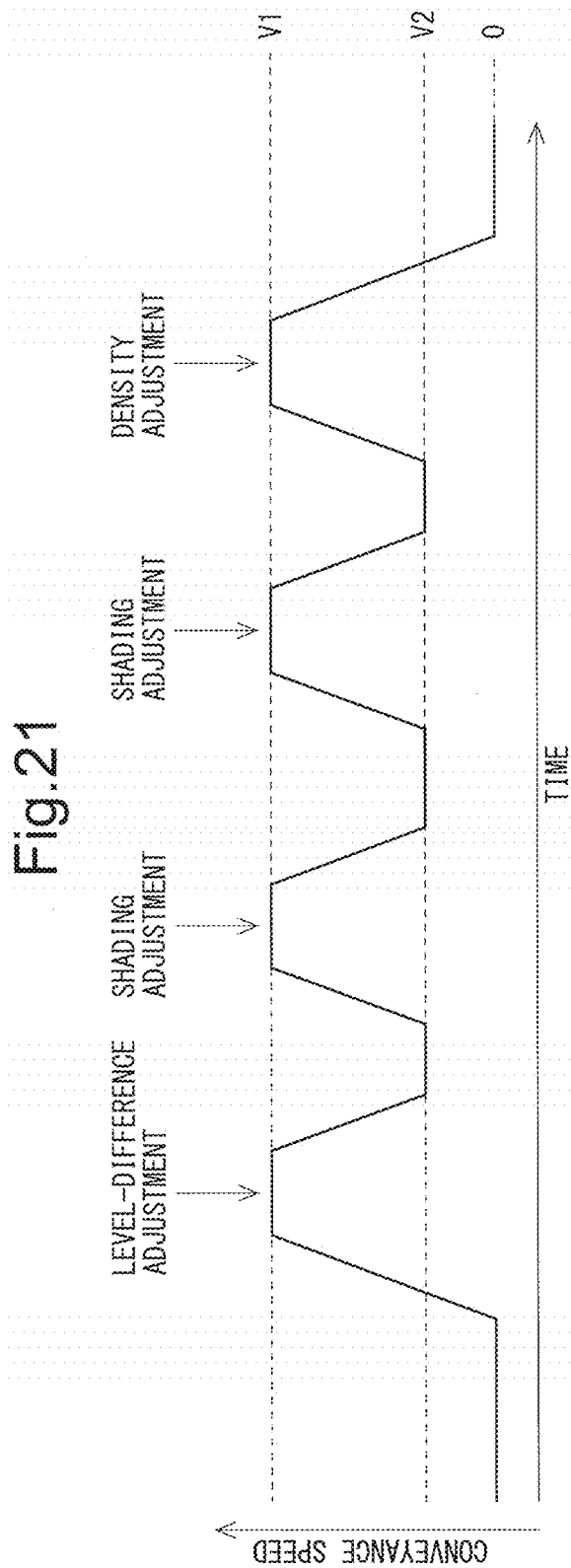
FIG. 21 is a waveform diagram showing a change in conveyance speed in a fifth modification of the embodiment.

FIG. 21 is a waveform diagram showing a change in conveyance speed in the present modification. After the conveyance speed first reaches the first speed V1, the conveyance speed decreases to the second speed V2 after the end of the chart imaging process in the level-difference adjustment, and the conveyance speed increases to the first speed V1 before the start of the chart printing process in the shading adjustment for the first time. Further, the conveyance speed decreases to the second speed V2 after the end of the chart imaging process in the shading adjustment for the first time, and the conveyance speed increases to the first speed V1 before the start of the chart printing process in the shading adjustment for the second time. Moreover, the conveyance speed decreases to the second speed V2 after the end of the chart imaging process in the shading adjustment for the second time, and the conveyance speed increases to the first speed V1 before the start of the chart printing process in the density adjustment. Then, after the chart imaging process in the density adjustment ends, the conveyance speed decreases to 0.

As described above, similarly to the above embodiment, the conveyance speed is maintained at the first speed V1 in the period during which the chart printing process is performed and the period during which the chart imaging process is performed, the conveyance speed decreases from the first speed V1 to the second speed V2 after the end of the chart imaging process in the adjustment process except for the adjustment process that is performed last in the batch adjustment process, and the conveyance speed increases from the second speed V2 to the first speed V1 before the start of the chart printing process in the adjustment process that is performed next.

<7.6 Sixth Modification>

In recent years, an inkjet printing apparatus capable of executing actual printing at a printing speed specified from among a plurality of types of printing speeds has been developed. For example, three types of printing speeds (150 mpm, 100 mpm, 70 mpm) are prepared, and actual printing is executed at a printing speed selected in accordance with a printing purpose or the like. Thus, as a sixth modification of the above embodiment, an example will be described in which the chart printing process and the chart imaging process in each adjustment process are executed at two types of conveyance speeds (printing speeds).

Figure 22:
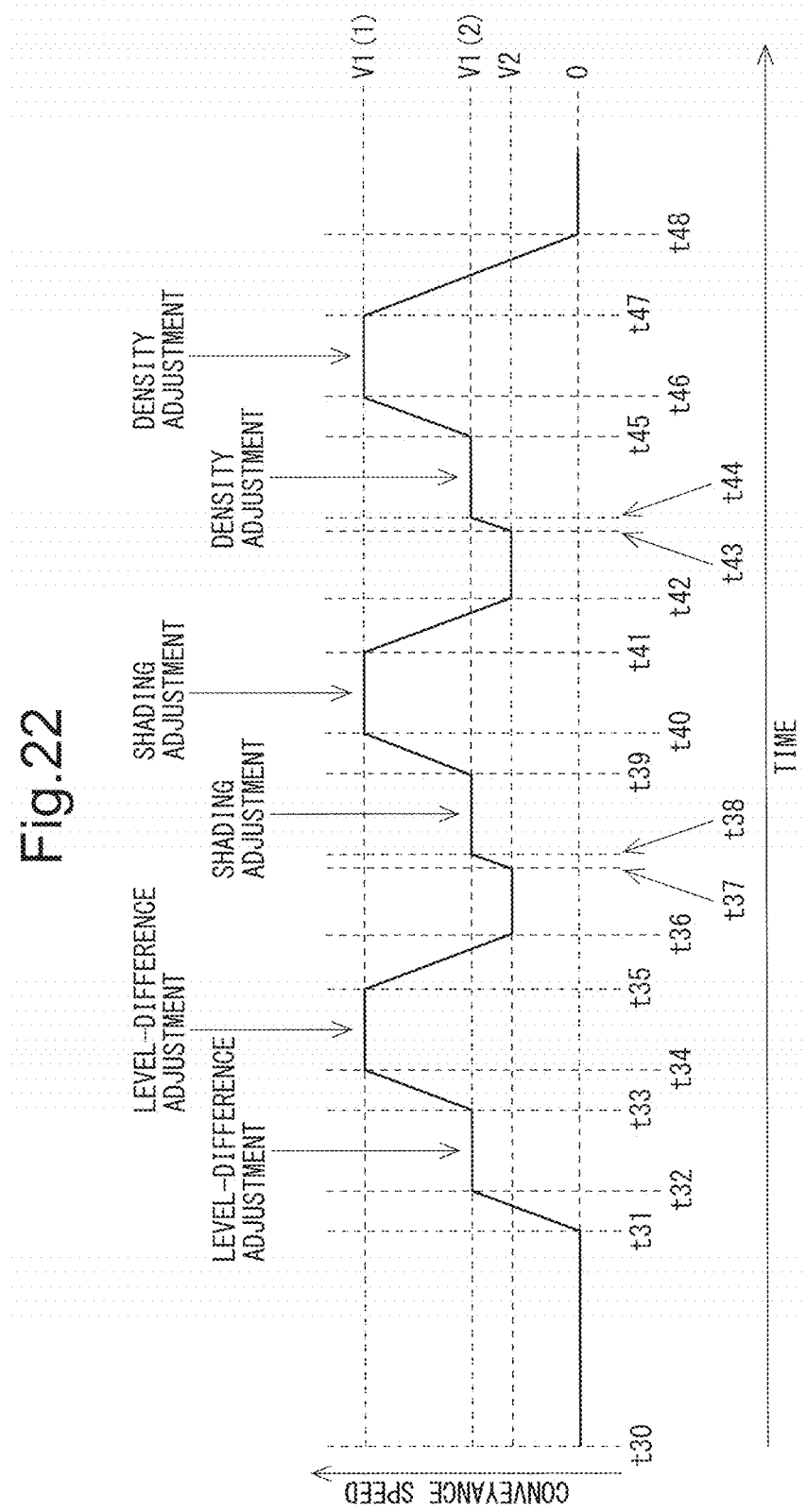
FIG. 22 is a waveform diagram showing a change in conveyance speed in a sixth modification of the embodiment.

FIG. 22 is a waveform diagram showing a change in conveyance speed in the present modification. In the present modification, a first-level first speed V1(1) and a second-level first speed V1(2) are prepared as the first speed V1. The second-level first speed V1(2) is lower than the first-level first speed V1(1). The chart printing process and the chart imaging process in each adjustment process are performed in two states of a state in which the conveyance speed is maintained at the first-level first speed V1(1) and a state in which the conveyance speed is maintained at the second-level first speed V1(2). Details will be described below.

At time point t30 when the operator presses the batch adjustment start button, the conveyance speed is 0. That is, the conveyance mechanism 210 is stopped. Thereafter, when printing on the print paper PA becomes possible at time point t31, the conveyance speed starts increasing gradually. When the conveyance speed reaches the second-level first speed V1(2) at time point t32, the chart printing process and the chart imaging process for the level-difference adjustment are performed. At time point t33 after the time point at which the chart imaging process ends, the conveyance speed starts increasing gradually again. When the conveyance speed reaches the first-level first speed V1(1) at time point t34, the chart printing process and the chart imaging process for the level-difference adjustment are performed again. At time point t35 after the time point at which the chart imaging process for the second time for the level-difference adjustment ends, the conveyance speed starts decreasing gradually. At time point t36, the conveyance speed reaches the second speed V2. Thereafter, at time point t37, the conveyance speed starts increasing gradually. When the conveyance speed reaches the second-level first speed V1(2) at time point t38, the chart printing process and the chart imaging process for the shading adjustment are performed. At time point t39 after the time point at which the chart imaging process ends, the conveyance speed starts increasing gradually again. When the conveyance speed reaches the first-level first speed V1(1) at time point t40, the chart printing process and the chart imaging process for the shading adjustment are performed again. At time point t41 after the time point at which the chart imaging process for the second time for the shading adjustment ends, the conveyance speed starts decreasing gradually. At time point t42, the conveyance speed reaches the second speed V2. Thereafter, at time point t43, the conveyance speed starts increasing gradually. When the conveyance speed reaches the second-level first speed V1(2) at time point t44, the chart printing process and the chart imaging process for the density adjustment are performed. At time point t45 after the time point at which the chart imaging process ends, the conveyance speed starts increasing gradually again. When the conveyance speed reaches the first-level first speed V1(1) at time point t46, the chart printing process and the chart imaging process for the density adjustment are performed again. At time point t47 after the time point at which the chart imaging process for the second time for the density adjustment ends, the conveyance speed starts decreasing gradually. Then, the conveyance speed becomes 0 at time point t48. That is, the conveyance mechanism 210 stops. The chart printing process and the chart imaging process are performed at two types of conveyance speeds for each target adjustment item, and hence the printing condition setting process is also performed so as to correspond to each of the two types of conveyance speeds.

As described above, in the present modification, the first-level first speed V1(1) and the second-level first speed V1(2) are prepared as the first speed V1. In one adjustment process, the chart printing process and the chart imaging process are performed in a state where the conveyance speed is maintained at the first-level first speed V1(1) and in a state where the conveyance speed is maintained at the second-level first speed V1(2), and in the printing condition setting process, the printing condition corresponding to each of the first-level first speed V1(1) and the second-level first speed V1(2) is set.

Incidentally, for example, in the inkjet printing apparatus 10 with three types of printing speeds (150 mpm, 100 mpm, 70 mpm) available, it is assumed that the batch adjustment process is performed with the first-level first speed V1(1) at 150 mpm and the second-level first speed V1(2) at 70 mpm. In this case, the value of the adjustment data corresponding to the conveyance speed of 100 mpm can be calculated by interpolation calculation using the value of the adjustment data calculated based on the imaging data Dc obtained with the conveyance speed maintained at 150 mpm and the value of the adjustment data calculated based on the imaging data Dc obtained with the conveyance speed maintained at 70 mpm. By employing such interpolation calculation, the value of the adjustment data corresponding to each of many types of conveyance speeds can be obtained quickly and easily.

<7.7 Seventh Modification>

In the above embodiment, the first speed V1 has been the same for all the target adjustment items, and the second speed V2 is also the same for all the target adjustment items. However, the present invention is not limited thereto, and the configuration may be such that at least one of the first speed V1 and the second speed V2 is different for each target adjustment item. Thus, as a seventh modification of the above embodiment, an example in which the second speed V2 is different for each target adjustment item will be described. In the present modification, similarly to the second modification, it is assumed that the level-difference adjustment, the shading adjustment, the density adjustment, and the ICC profile creation process are performed in this order by the batch adjustment process.

When the relationship between the time required for setting (the time required for the printing condition setting process) and the reducible speed is the relationship represented by the thick dotted line denoted by reference numeral 78 in FIG. 14, and the time required for setting for each target adjustment item is as shown in a portion denoted by reference numeral 84 in FIG. 23, the reducible speed for each target adjustment item is as shown in a portion denoted by reference numeral 85 in FIG. 23. In this example, the first speed V1 is 150 mpm, and hence the second speed V2 for each target adjustment item is as shown in a portion denoted by reference numeral 86 in FIG. 23. That is, the second speed V2 after the end of the chart imaging process in the level-difference adjustment and the second speed V2 after the end of the chart imaging process in the shading adjustment are set to 0 mpm, whereas the second speed V2 after the end of the chart imaging process in the density adjustment is set to 50 mpm. Note that it is not necessary to set the second speed V2 for the ICC profile creation process because the ICC profile creation process is the adjustment process that is performed last. Therefore, in FIG. 23, each field for the ICC profile creation process is blank.

FIG. 24 is a waveform diagram showing a change in conveyance speed in the present modification. After the chart imaging process in the level-difference adjustment ends and after the chart imaging process in the shading adjustment ends, the conveyance speed has decreased from 150 mpm to 0 mpm. In contrast, after the chart imaging process in the density adjustment ends, the conveyance speed has decreased from 150 mpm to 50 mpm. By varying the second speed V2 for each target adjustment item in this manner, it is possible to reduce waste paper and shorten the time required for adjustment more effectively.

Although the example in which the second speed V2 is varied for each target adjustment item has been described here, the first speed V1 may be varied for each target adjustment item, or both the first speed V1 and the second speed V2 may be varied for each target adjustment item.

<8. Others>

The present invention is not limited to each of the above embodiments (including the modifications), and various modifications can be made without departing from the gist of the present invention. For example, although the configuration of the inkjet printing apparatus 10 that performs color printing has been exemplified in the above embodiment, the present invention can also be applied to a case in which an inkjet printing apparatus that performs monochrome printing is employed. Moreover, although the configuration of the inkjet printing apparatus 10 using aqueous ink has been exemplified in the above embodiment, the present invention can also be applied to a case in which an inkjet printing apparatus using ultraviolet (UV) ink (ultraviolet curing ink) such as an inkjet printing apparatus for label printing is employed. In this case, an ultraviolet irradiation unit for curing the UV ink on the print paper PA by ultraviolet irradiation is provided inside the printing mechanism 20 (cf. FIG. 2) instead of the drying unit 26. Further, the base material on which printing is performed is not limited to a paper material print medium, and may be a transparent, translucent, or opaque polyethylene terephthalate (PET) film.

This application is an application claiming priority based on Japanese Patent Application No. 2022-103315 entitled "Printing Apparatus and Adjustment Method Therefor" filed on Jun. 28, 2022, and the contents of which are herein incorporated by reference.

What is claimed is:

1. A printing apparatus comprising:
   a conveyance mechanism configured to convey a base material;
   a printing unit configured to perform printing on the base material by ejecting ink;
   a reading unit configured to read a printed image obtained by printing by the printing unit;
   a conveyance control unit configured to control a conveyance speed that is a speed at which the conveyance mechanism conveys the base material; and
   a printing condition setting unit configured to set a printing condition, wherein
   a batch adjustment process of performing a plurality of times of adjustment processes related to printing in succession based on one instruction from an outside is executable,
   one adjustment process includes a chart printing process in which the printing unit prints an inspection chart corresponding to a target adjustment item, a chart reading process in which the reading unit reads a printed image of the inspection chart, and a printing condition setting process in which the printing condition setting unit sets a printing condition based on read data obtained by the chart reading process, the conveyance control unit maintains the conveyance speed at a first speed in a period when the chart printing process is performed and a period when the chart reading process is performed, after an end of the chart reading process in an adjustment process that is performed last in the batch adjustment process, the conveyance control unit decreases the conveyance speed to 0 and does not increase the conveyance speed, and after an end of the chart reading process in the adjustment process except for the adjustment process that is performed last in the batch adjustment process, the conveyance control unit decreases the conveyance speed to a second speed lower than the first speed and increases the conveyance speed to the first speed before a start of the chart printing process in an adjustment process that is performed next.

2. The printing apparatus according to claim 1, wherein adjustment processes for a plurality of target adjustment items are performed by the batch adjustment process.

3. The printing apparatus according to claim 2, wherein an imaging unit configured to capture a printed image obtained by printing by the printing unit is provided as the reading unit, by the batch adjustment process, a level-difference adjustment, a shading adjustment, and a density adjustment are performed in this order as the adjustment processes for the plurality of target adjustment items, and in the chart reading process in each of the level-difference adjustment, the shading adjustment, and the density adjustment, a chart imaging process in which the imaging unit captures a printed image of an inspection chart is performed.

4. The printing apparatus according to claim 2, wherein an imaging unit configured to capture a printed image obtained by printing by the printing unit, and a colorimetry unit configured to perform colorimetry are provided as the reading unit, by the batch adjustment process, a level-difference adjustment, a shading adjustment, a density adjustment, and a color profile creation process are performed in this order as the adjustment processes for the plurality of target adjustment items, in the chart reading process in each of the level-difference adjustment, the shading adjustment, and the density adjustment, a chart imaging process in which the imaging unit captures a printed image of an inspection chart is performed, in the chart reading process in the color profile creation process, a colorimetry process in which the colorimetry unit performs colorimetry of a printed image of an inspection chart is performed, and in the printing condition setting process in the color profile creation process, a color profile is created based on colorimetric data obtained by the colorimetry process.

5. The printing apparatus according to claim 2, further comprising a target adjustment item selection unit configured to select, from an outside, a target adjustment item that is a target of an adjustment process by the batch adjustment process.

6. The printing apparatus according to claim 5, wherein a priority order related to an execution order is determined in advance for a plurality of target adjustment items selectable by the target adjustment item selection unit, and by the batch adjustment process, adjustment processes for one or more target adjustment items selected by the target adjustment item selection unit are performed in an order according to the priority order.

7. The printing apparatus according to claim 2, wherein the conveyance control unit varies the first speed for each of the target adjustment items.

8. The printing apparatus according to claim 2, wherein the conveyance control unit varies the second speed for each of the target adjustment items.

9. The printing apparatus according to claim 2, wherein the conveyance control unit varies at least one of the first speed and the second speed for each of the target adjustment items.

10. The printing apparatus according to claim 1, wherein the second speed is set so as to minimize a conveyance distance of the base material by execution of the batch adjustment process.

11. The printing apparatus according to claim 10, wherein the second speed is set so as to minimize a conveyance distance L of the base material calculated by the following equation:

$$L = \frac{(V1 - V2) \times (Td - Tu)}{2} + (V2 \times Ta)$$

where V1 is the first speed, V2 is the second speed, Ta is a time required from an end point of the chart reading process to an end of the printing condition setting process, Td is a time required for the conveyance speed to decrease from the first speed to the second speed, and Tu is a time required for the conveyance speed to increase from the second speed to the first speed.

12. The printing apparatus according to claim 1, wherein the second speed is 0.

13. The printing apparatus according to claim 1, wherein the conveyance control unit starts increasing the conveyance speed at a time point when (Ta-Tu) time has elapsed from an end point of the chart reading process in an adjustment process except for an adjustment process that is performed last in the batch adjustment process, the Ta being a time required from the end point of the chart reading process to an end of the printing condition setting process, and the Tu being a time required for the conveyance speed to increase from the second speed to the first speed.

14. The printing apparatus according to claim 1, wherein a first-level first speed and a second-level first speed are prepared as the first speed, and in one adjustment process, the chart printing process and the chart reading process are performed in a state where the conveyance speed is maintained at the first-level first speed and in a state where the conveyance speed is maintained at the second-level first speed, and a printing condition corresponding to each of the first-level first speed and the second-level first speed is set in the printing condition setting process.

15. An adjustment method for a printing apparatus including a conveyance mechanism configured to convey a base material, a printing unit configured to perform printing on the base material by ejecting ink, a reading unit configured to read a printed image obtained by printing by the printing unit, a conveyance control unit configured to control a conveyance speed being a speed at which the conveyance mechanism conveys the base material, and a printing condition setting unit configured to set a printing condition, the adjustment method comprising:

an adjustment instruction step of instructing, by an operator, the printing apparatus to execute a batch adjustment process; and a plurality of times of adjustment steps of repeatedly performing, by the printing apparatus, an adjustment process related to printing based on an instruction by the adjustment instruction step, wherein the adjustment step at each time includes an acceleration step of increasing the conveyance speed by the conveyance control unit, a chart printing step of printing an inspection chart corresponding to a target adjustment item by the printing unit, a chart reading step of reading a printed image of the inspection chart by the reading unit, a deceleration step of decreasing the conveyance speed by the conveyance control unit, and a printing condition setting step of setting, by the printing condition setting unit, a printing condition based on read data obtained in the chart reading step, in the acceleration step included in the adjustment step for a first time, the conveyance control unit increases the conveyance speed from 0 to a first speed, in the acceleration step included in the adjustment step except for the first time, the conveyance control unit increases the conveyance speed from a second speed lower than the first speed to the first speed, the chart printing step and the chart reading step included in the adjustment step at each time are performed in a state where the conveyance speed is maintained at the first speed by the conveyance control unit, in the deceleration step included in the adjustment step except for a last time, the conveyance control unit decreases the conveyance speed from the first speed to the second speed, and in the deceleration step included in the adjustment step for the last time, the conveyance control unit decreases the conveyance speed from the first speed to 0.

16. A printing apparatus comprising:

a conveyor configured to convey a base material;

an inkjet head group configured to perform printing on the base material by ejecting ink;

a reading device configured to read a printed image obtained by printing by the inkjet head group;

a conveyance controller configured to control a conveyance speed that is a speed at which the conveyor conveys the base material; and a processor configured to set a printing condition, wherein a batch adjustment process of performing a plurality of times of adjustment processes related to printing in succession based on one instruction from an outside is executable, one adjustment process includes a chart printing process in which the inkjet head group prints an inspection chart corresponding to a target adjustment item, a chart reading process in which the reading device reads a printed image of the inspection chart, and a printing condition setting process in which the processor sets a printing condition based on read data obtained by the chart reading process, the conveyance controller maintains the conveyance speed at a first speed in a period when the chart printing process is performed and a period when the chart reading process is performed, after an end of the chart reading process in an adjustment process that is performed last in the batch adjustment process, the conveyance controller decreases the conveyance speed to 0 and does not increase the conveyance speed, and after an end of the chart reading process in the adjustment process except for the adjustment process that is performed last in the batch adjustment process, the conveyance controller decreases the conveyance speed to a second speed lower than the first speed and increases the conveyance speed to the first speed before a start of the chart printing process in an adjustment process that is performed next.

\* \* \* \* \*